United States Patent
Lee et al.

(10) Patent No.: US 9,363,798 B2
(45) Date of Patent: Jun. 7, 2016

(54) METHOD AND DEVICE FOR TERMINAL TO TRANSMIT/RECEIVE SIGNAL IN WIRELESS COMMUNICATION SYSTEM HAVING CARRIER AGGREGATION TECHNIQUE APPLIED THERETO

(75) Inventors: Seungmin Lee, Anyang-si (KR); Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 104 days.

(21) Appl. No.: 14/003,550

(22) PCT Filed: Mar. 7, 2012

(86) PCT No.: PCT/KR2012/001660
§ 371 (c)(1),
(2), (4) Date: Sep. 6, 2013

(87) PCT Pub. No.: WO2012/124924
PCT Pub. Date: Sep. 20, 2012

(65) Prior Publication Data
US 2014/0003387 A1    Jan. 2, 2014

Related U.S. Application Data

(60) Provisional application No. 61/451,612, filed on Mar. 11, 2011, provisional application No. 61/474,251, filed on Apr. 11, 2011, provisional application No. 61/490,606, filed on May 27, 2011, provisional application No. 61/505,104, filed on Jul. 6, 2011, provisional application No. 61/527,598, filed on Aug. 25, 2011.

(51) Int. Cl.
*H04W 4/00* (2009.01)
*H04W 72/00* (2009.01)
(Continued)

(52) U.S. Cl.
CPC ........... *H04W 72/0406* (2013.01); *H04L 5/001* (2013.01); *H04L 5/0048* (2013.01);
(Continued)

(58) Field of Classification Search
CPC .. H04W 74/002; H04W 72/04; H04W 84/047
See application file for complete search history.

(56) References Cited

U.S. PATENT DOCUMENTS 7,164,660 B2 * 1/2007 Baker .................... H04W 52/50
370/318
8,837,352 B2 * 9/2014 Cho ..................... H04W 74/006
370/322

(Continued)

FOREIGN PATENT DOCUMENTS

CN  101911805 A  12/2010
KR  10-0856207 B1  9/2008
(Continued)

*Primary Examiner* — Melanie Jagannathan
(74) *Attorney, Agent, or Firm* — Birch, Stewart, Kolasch & Birch, LLP

(57) ABSTRACT

Disclosed in the present invention is a method for a terminal to transceive a base station and a signal in a wireless communication system having a carrier aggregation technique applied thereto. More particularly, the present invention comprises the steps of: receiving a preamble from the base station through a specific component carrier; determining the use of either an uplink or a downlink of a corresponding subframe, on the basis of the preamble; and executing either the transmission of an uplink signal to the base station through the specific component carrier, or the reception of a downlink signal from the base station through the specific component carrier, according to the result of the determining step.

8 Claims, 27 Drawing Sheets

(51) Int. Cl.
*H04W 72/04* (2009.01)
*H04L 5/00* (2006.01)
*H04L 5/14* (2006.01)

(52) U.S. Cl.
CPC ............ H04L5/0096 (2013.01); H04L 5/1469 (2013.01); H04W 72/0446 (2013.01); *H04L 5/0055* (2013.01); *H04L 5/0064* (2013.01)

(56) References Cited

U.S. PATENT DOCUMENTS

| | | | |
|---|---|---|---|
| 2007/0097887 A1 | 5/2007 | Kim et al. | |
| 2009/0186613 A1* | 7/2009 | Ahn | H04L 5/003 455/434 |
| 2009/0201838 A1 | 8/2009 | Zhang et al. | |
| 2010/0220694 A1* | 9/2010 | Huang | H04W 56/0005 370/336 |
| 2010/0246475 A1* | 9/2010 | Naden | H04B 7/155 370/315 |
| 2010/0296472 A1 | 11/2010 | Lee et al. | |
| 2011/0013543 A1* | 1/2011 | Lim | H04W 72/042 370/281 |
| 2011/0014922 A1* | 1/2011 | Jen | H04W 74/002 455/450 |
| 2011/0045837 A1 | 2/2011 | Kim et al. | |
| 2011/0235609 A1* | 9/2011 | Ahn | H04L 5/0007 370/329 |
| 2011/0287794 A1* | 11/2011 | Koskela | H04W 28/08 455/509 |
| 2012/0052898 A1* | 3/2012 | Hegge | H04W 74/04 455/511 |
| 2012/0077510 A1* | 3/2012 | Chen | H04W 28/26 455/452.1 |
| 2012/0147794 A1* | 6/2012 | Chung | H04W 72/0406 370/280 |
| 2012/0314675 A1* | 12/2012 | Vujcic | H04L 5/001 370/329 |
| 2012/0327910 A1* | 12/2012 | Dalsgaard | H04L 5/0098 370/335 |

FOREIGN PATENT DOCUMENTS

| | | |
|---|---|---|
| KR | 10-2009-0082851 A | 7/2009 |
| KR | 10-2011-0020170 A | 3/2011 |
| WO | WO 2010/104290 A2 | 9/2010 |

* cited by examiner (a) Control - Plane Protocol Stack (b) User - Plane Protocol Stack (a) 1TX or 2TX (b) 4 TX

US 9,363,798 B2

METHOD AND DEVICE FOR TERMINAL TO TRANSMIT/RECEIVE SIGNAL IN WIRELESS COMMUNICATION SYSTEM HAVING CARRIER AGGREGATION TECHNIQUE APPLIED THERETO

This application is the National Phase of PCT/KR2012/001660 filed Mar. 7, 2012, which claims priority under 35 U.S.C. 119(e) to U.S. Provisional Application Nos. 61/451,612filed on Mar. 11, 2011, 61/474,251 filed on Apr. 11, 2011, 61/490,606 filed on May 27, 2011, 61/505,104 filed on Jul. 6, 2011 and 61/527,598 filed on Aug. 25, 2011, all of which are hereby expressly incorporated by reference into the present application.

TECHNICAL FIELD

The present invention relates to a wireless communication system and, more particularly, to a method of a user equipment transmitting and receiving a signal in a wireless communication system having a carrier aggregation technique applied thereto and an apparatus for the same.

BACKGROUND ART

A brief description will be given of a Third Generation Partnership Project Long Term Evolution (3GPP LTE) (hereinafter, referred to as "LTE") communication system, which is an example of a wireless communication system to which the present invention is applicable.

FIG. 1 is a view schematically showing a network structure of an Evolved Universal Mobile Telecommunications System (E-UMTS) as an example of a wireless communication system. The E-UMTS system has evolved from the conventional UMTS system and basic standardization thereof is currently underway in the 3GPP. E-UMTS may be generally referred to as a Long Term Evolution (LTE) system. For details of the technical specifications of the UMTS and E-UMTS, refer to Release 7 and Release 8 of "Third Generation Partnership Project; Technical Specification Group Radio Access Network," respectively.

Referring to FIG. 1, the E-UMTS includes a User Equipment (UE), eNode Bs (eNBs), and an Access Gateway (AG), which is located at an end of a network (E-UTRAN) and is connected to an external network. eNBs may simultaneously transmit multiple data streams for a broadcast service, a multicast service, and/or a unicast service.

One or more cells may exist per eNB. A cell is configured to use one selected from among bandwidths of 1.25, 2.5, 5, 10, 15, and 20 Mhz to provide a downlink or uplink transport service to several UEs. Different cells may be configured to provide different bandwidths. The eNB controls data transmission to and data reception from a plurality of UEs. The eNB transmits downlink scheduling information with respect to downlink (DL) data to notify a corresponding UE of a time/frequency domain in which data is to be transmitted, coding, data size, and Hybrid Automatic Repeat and reQuest (HARQ)-related information. In addition, the eNB transmits uplink scheduling information with respect to uplink (UL) data to a corresponding UE to inform the UE of an available time/frequency domain, coding, data size, and HARQ-related information. An interface for transmitting user traffic or control traffic may be used between eNBs. A Core Network (CN) may include the AG and a network node for user registration of the UE. The AG manages mobility of a UE on a Tracking Area (TA) basis, wherein one TA includes a plurality of cells.

Although wireless communication technology has been developed up to LTE based on Wideband Code Division Multiple Access (WCDMA), demands and expectations of users and providers continue to increase. In addition, since other radio access technologies continue to be developed, new technology is required to secure competitiveness in the future. For example, decrease of cost per bit, increase of service availability, flexible use of a frequency band, simple structure, open interface, and suitable power consumption by a UE are required.

DISCLOSURE

Technical Problem

An object of the present invention devised to solve the problem lies in a method of a user equipment transmitting and receiving a signal in a wireless communication system having a carrier aggregation technique applied thereto and an apparatus for the same.

Technical Solution

In accordance with an aspect of the present invention, the above objects may be accomplished by the provision of a method of a user equipment transmitting and receiving a signal to and from an eNode B in a wireless communication system having a carrier aggregation technique applied thereto, the method including receiving a preamble from the eNode B through a specific component carrier, determining use of one selected from between uplink and downlink of a corresponding subframe based on the preamble, and performing one selected from between transmission of an uplink signal to the eNode B through the specific component carrier and reception of a downlink signal from the eNode B through the specific component carrier according to a result of determination.

The method may further include performing a carrier sensing procedure with respect to an unlicensed frequency band and configuring the unlicensed frequency band as the specific component carrier upon sensing that the unlicensed frequency band is in an idle state.

The corresponding subframe may include a guard section between a reception section of the preamble and a transmission section of the uplink signal or a reception section of the downlink signal.

Particularly, in a case in which the corresponding subframe is used for transmission of the uplink signal, the corresponding subframe may include a reception section of the preamble, a first guard section, a transmission section of the uplink signal, and a second guard section. In this case, the first guard section may be a reception-transmission switching time of the user equipment and the second guard section may be a transmission-reception switching time of the user equipment.

In accordance with another aspect of the present invention, there is provided a method of a user equipment transmitting and receiving a signal to and from an eNode B in a wireless communication system having a carrier aggregation technique applied thereto, the method including receiving information regarding configuration of at least one uplink-downlink subframe from the eNode B, performing a carrier sensing procedure with respect to an unlicensed frequency band, configuring the unlicensed frequency band as a secondary component carrier upon sensing that the unlicensed frequency band is in an idle state, and applying the configuration of the at least one uplink-downlink subframe from a predetermined time.

The predetermined time may be a time when a preamble corresponding to the configuration of the uplink-downlink subframe is received.

A specific region of subframes according to the configuration of the at least one uplink-downlink subframe may be configured as an exclusive region for the carrier sensing procedure. The specific region may be a second slot of a last one of the subframes according to the configuration of the at least one uplink-downlink subframe or a half region of a final symbol of a last one of the subframes according to the configuration of the at least one uplink-downlink subframe.

The method may further include receiving a dummy signal to occupy the unlicensed frequency band from the eNode B after the step of configuring the unlicensed frequency band as the secondary component carrier.

The method may further include receiving an uplink grant at a downlink subframe of the secondary component carrier, receiving an enabling indicator corresponding to the uplink grant, and performing uplink transmission according to the uplink grant at a time corresponding to the enabling indicator. The time corresponding to the enabling indicator may be a subframe having received enabling indicator or a next subframe.

The subframes according to the configuration of the at least one uplink-downlink subframe may include one selected from between an uplink subframe and a downlink subframe. In this case, an uplink grant received at the downlink subframe may include information regarding a subframe to which an uplink signal will be transmitted in correspondence to the uplink grant.

Advantageous Effects

According to embodiments of the present invention, it is possible for a user equipment to efficiently transmit and receive a signal using an unlicensed band in a case in which a carrier aggregation technique is applied to a wireless communication system.

It will be appreciated by persons skilled in the art that the effects that can be achieved with the present invention are not limited to what has been particularly described hereinabove and other advantages of the present invention will be more clearly understood from the following detailed description.

BEST MODE

The configuration, operation, and other features of the present invention will be more clearly understood from the following detailed description of preferred embodiments taken in conjunction with the accompanying drawings. The following embodiments are examples of applying the technical features of the present invention to a Third Generation Partnership Project (3GPP) system.

Although the embodiments of the present invention are described using an LTE system and an LTE-A system in this specification, the embodiments of the present invention are applicable to any communication system satisfying the above definition. In addition, although the embodiments of the present invention are described based on a Frequency Division Duplex (FDD) scheme in this specification, the embodiments of the present invention may be easily modified and applied to a Half-Duplex FDD (H-FDD) scheme or a Time Division Duplex (TDD) scheme.

Figure 1:
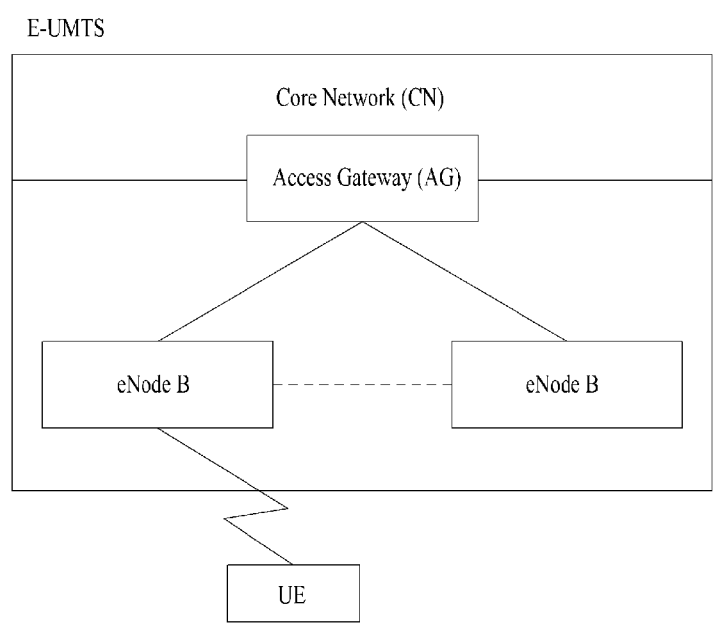
FIG. 1 is a view schematically showing a network structure of an Evolved Universal Mobile Telecommunications System (E-UMTS) as an example of a wireless communication system.
Figure 2:
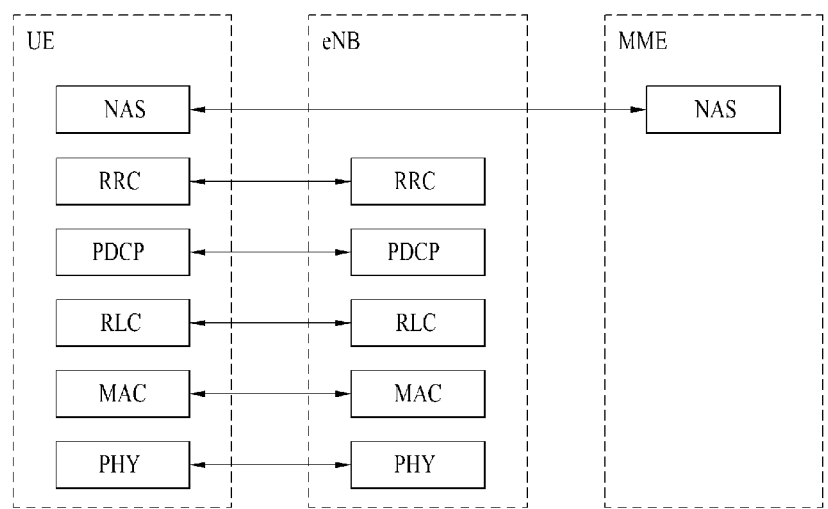
FIG. 2 is a view showing structures of a control plane and a user plane of a radio interface protocol between a User Equipment (UE) and an Evolved Universal Terrestrial Radio Access Network (E-UTRAN) based on a Third Generation Partnership Project (3GPP) radio access network standard.
Figure 2:
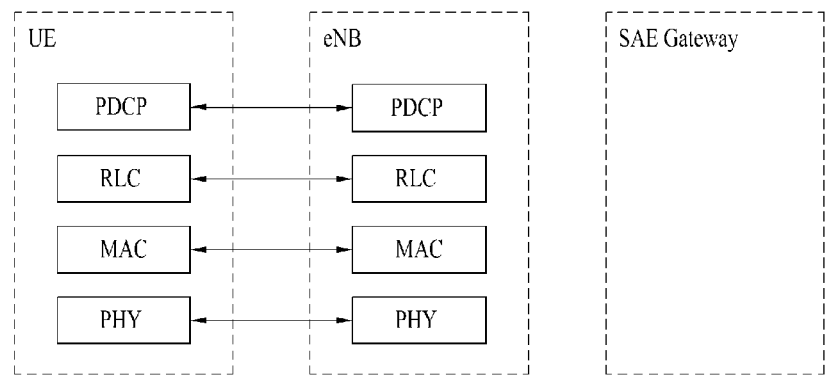

FIG. 2 is a view showing structures of a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g. voice data or Internet packet data.

A physical layer of a first layer provides an information transfer service to a higher layer using a physical channel. The physical layer is connected to a Medium Access Control layer located on a higher layer via a transport channel. Data is transported between the Medium Access Control layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block in the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a limited bandwidth.

A Radio Resource Control (RRC) layer located at the bottom of a third layer is defined only in the control plane. The RRC layer is responsible for control of logical, transport, and physical channels in association with configuration, re-configuration, and release of Radio Bearers (RBs). The RB is a service that the second layer provides for data communication between the UE and the network. To this end, the RRC layer of the UE and the RRC layer of the network exchange RRC messages. The UE is in an RRC connected mode in a case in which RRC connection has been established (RRC is connected) between the RRC layer of the UE and the RRC layer of the network. Otherwise, the UE is in an RRC idle mode. A Non-Access Stratum (NAS) layer located above the RRC layer performs functions such as session management and mobility management.

One cell of the eNB is configured to use one selected from among bandwidths of 1.25, 2.5, 5, 10, 15, and 20 Mhz to provide a downlink or uplink transmission service to several UEs. Different cells may be configured to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). On the other hand, uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
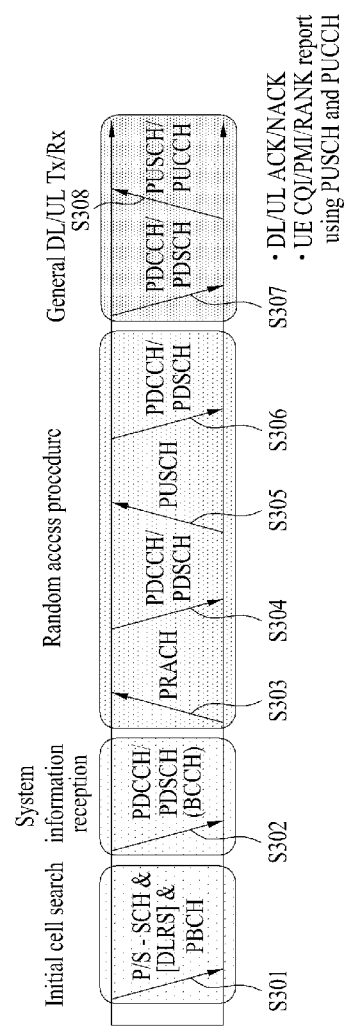
FIG. 3 is a view illustrating physical channels used in a 3GPP system and a general signal transmission method using the same.

FIG. 3 is a view illustrating physical channels used in a 3GPP system and a general signal transmission method using the same.

A UE performs an initial cell search operation such as synchronization with an eNB upon being powered on or entering a new cell (S301). To this end, the UE may receive a Primary Synchronization Channel (P-SCH) and a Secondary Synchronization Channel (S-SCH) from the eNB to perform synchronization with the eNB and to acquire information such as a cell ID. Thereafter, the UE may receive a physical broadcast channel from the eNB to acquire broadcast information in the cell. Meanwhile, the UE may receive a Downlink Reference Signal (DL RS) to confirm a downlink channel state at the initial cell search step.

The UE, having completed the initial cell search, may receive a Physical Downlink Control Channel (PDCCH) and a Physical Downlink Shared Channel (PDSCH) according to information contained in the PDCCH to acquire more detailed system information (S302).

Meanwhile, in a case in which the eNB is initially accessed or radio resources for signal transmission are not present, the UE may perform a Random Access Procedure (RACH) (step S303 to step S306) with respect to the eNB. To this end, the UE may transmit a specific sequence through a Physical Random Access Channel (PRACH) as a preamble (S303) and receive a response message of the preamble through the PDCCH and the PDSCH corresponding thereto (S304). In the case of contention-based RACH, a contention resolution procedure may be further performed.

The UE, having performed the above procedures, may perform PDCCH/PDSCH reception (S307) and Physical Uplink Shared Channel (PUSCH)/Physical Uplink Control Channel (PUCCH) transmission (S308) as a general uplink/downlink signal transmission procedure. In particular, the UE receives Downlink Control Information (DCI) through the PDCCH. The DCI includes control information such as resource allocation information with respect to the UE and has different formats based on the purpose of use.

Meanwhile, the control information transmitted from the UE to the eNB or from the eNB to the UE in uplink includes a downlink/uplink ACK/NACK signal, a Channel Quality Indicator (CQI), a Precoding Matrix Index (PMI), and a Rank Indicator (RI). In the case of the 3GPP LTE system, the UE may transmit the control information such as CQI/PMI/RI through the PUSCH and/or the PUCCH.

Figure 4:
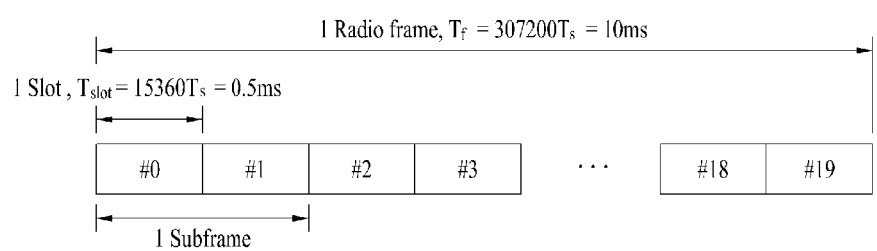
FIG. 4 is a view exemplarily showing the structure of a radio frame used in a Long Term Evolution (LTE) system.

FIG. 4 is a view showing the structure of a radio frame used in an LTE system.

Referring to FIG. 4, the radio frame has a length of 10 ms (327200×$T_s$) and includes 10 subframes of the same size. Each of the subframes has a length of 1 ms and includes two slots. Each of the slots has a length of 0.5 ms (15360×$T_s$). $T_s$ denotes a sampling time and is represented by $T_s$=1/(15 kHz× 2048)=3.2552×$10^{-8}$ (about 33 ns). Each slot includes a plurality of OFDM symbols in a time domain and a plurality of resource blocks (RBs) in a frequency domain. In the LTE system, one RB includes 12 subcarriers×7(6) OFDM symbols. A Transmission Time Interval (TTI) which is a unit time for transmission of data may be determined in units of one or more subframes. The structure of the radio frame is only illustrative and the number of subframes included in the radio frame, the number of slots included in the subframe, or the number of OFDM symbols included in the slot may be variously modified.

Figure 5:
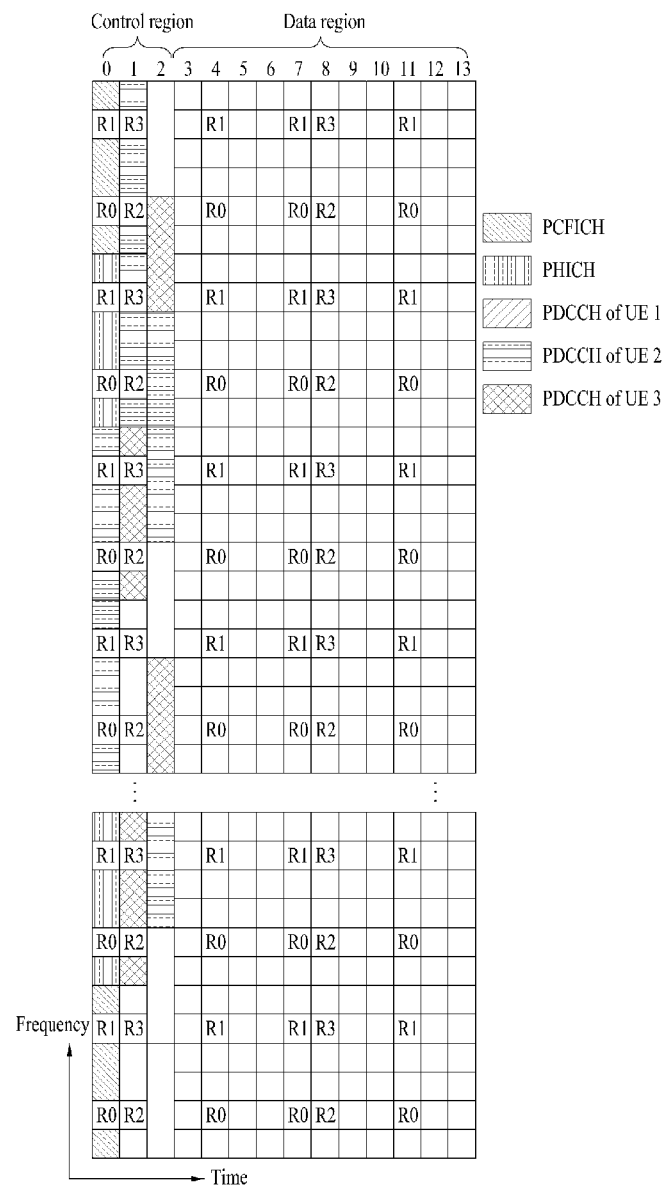
FIG. 5 is a view exemplarily showing the structure of a downlink radio frame used in an LTE system.

FIG. 5 is a view exemplarily showing a control channel included in a control region of one subframe of a downlink radio frame.

Referring to FIG. 5, the subframe includes 14 OFDM symbols. The first to third OFDM symbols are used as a control region and the remaining 13 to 11 OFDM symbols are used as a data region, according to configuration of the subframe. In the drawing, R1 to R4 denote Reference Signals (RSs) or Pilot Signals for antennas 0 to 3. The RS is fixed in the subframe in a constant pattern regardless of the control region and the data region. A control channel is allocated to resources, to which the RS is not allocated, in the control region and a traffic channel is also allocated to resources, to which the RS is not allocated, in the data region. Examples of the control channel allocated to the control region include a Physical Control Format Indicator CHannel (PCFICH), a Physical Hybrid-ARQ Indicator CHannel (PHICH), and a Physical Downlink Control CHannel (PDCCH).

The PCFICH is a Physical Control Format Indicator Channel, which informs the UE of the number of OFDM symbols used for the PDCCH per subframe. The PCFICH is located at a first OFDM symbol and is configured prior to the PHICH and the PDCCH. The PCFICH includes four Resource Element Groups (REGs) and the respective REGs are dispersed in the control region based on cell IDentity (ID). One REG includes four resource elements (REs). Each RE indicates a minimum physical resource defined by one subcarrier×one OFDM symbol. The PCFICH has a value of 1 to 3 or 2 to 4 according to the bandwidth thereof and is modulated by Quadrature Phase Shift Keying (QPSK).

The PHICH is a Physical Hybrid-Automatic Repeat and Request (ARQ) Indicator Channel, which is used to transmit HARQ ACK/NACK for uplink transmission. That is, the PHICH indicates a channel to transmit DL ACK/NACK information form UL HARQ. The PHICH includes one REG and is scrambled on a cell-specific basis. ACK/NACK is indicated by one bit and is modulated by binary phase shift keying (BPSK). The modulated ACK/NACK is spread with a Spreading Factor (SF) of 2 or 4. A plurality of PHICHs mapped to the same resource constitutes a PHICH group. The number of PHICHs multiplexed to the PHICH group is decided based on the number of spreading codes. The PHICH (group) is repeated three times to acquire a diversity gain in the frequency domain and/or the time domain.

The PDCCH is a Physical Downlink Control Channel, which is allocated to first n OFDM symbols of a subframe, where n is an integer of 1 or more and is indicated by a PCFICH. The PDCCH includes one or more Control Channel Elements (CCEs). The PDCCH informs each UE or a UE group of information associated with resource allocation of a Paging channel (PCH) and a Downlink-shared channel (DL-SCH), both of which are transport channels, Uplink Scheduling Grant, HARQ information, etc. The paging channel (PCH) and the downlink-shared channel (DL-SCH) are transmitted through a PDSCH. Accordingly, the eNB and the UE generally transmit and receive data through the PDSCH except for specific control information or specific service data.

Information indicating to which UE (one UE or a plurality of UEs) data of the PDSCH is transmitted and indicating how the UEs receive and decode the PDSCH data is transmitted in a state of being included in the PDCCH. For example, it is assumed that a specific PDCCH is CRC-masked with a Radio Network Temporary Identity (RNTI) "A" and information regarding data transmitted using radio resource (for example, frequency location) "B" and transmission format information (for example, transmission block size, modulation scheme, coding information, etc.) "C" is transmitted via a specific subframe. In this case, one or more UEs located in a cell monitor a PDCCH using their own RNTI information and, in a case in which one or more UEs having RNTI "A" are present, the UEs receive the PDCCH and receive the PDSCH indicated by "B" and "C" through the information regarding the received PDCCH.

Figure 6:
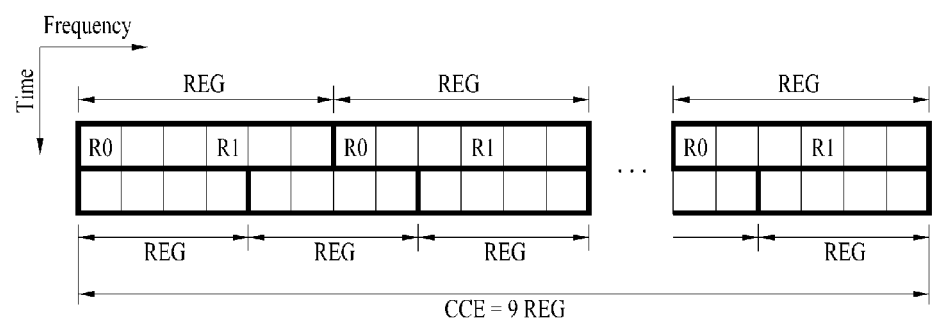
FIG. 6 is a view showing a resource unit used to configure a control channel.
Figure 6:
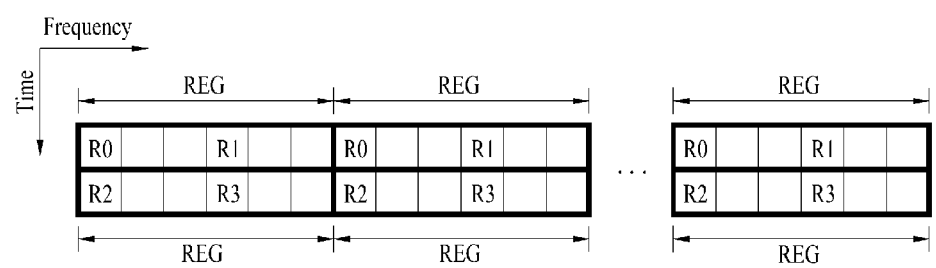

FIG. 6 is a view showing a resource unit used to configure a control channel. In particular, FIG. 6(*a*) shows a case in which the number of transmit antennas of eNBs is 1 or 2 and FIG. 6(*b*) shows a case in which the number of transmit antennas of eNBs is 4. Methods of configuring a resource unit related to a control channel are the same except that Reference Signal (RS) patterns differ depending upon the number of transmit antennas.

Referring to FIG. 6, a basic resource unit of a control channel is an REG. Each REG includes four neighboring resource elements (REs) except an RS(s). Each REG is shown by a solid line in the drawing. A PCFICH and a PHICH include 4 REGs and 3 REGs, respectively. A PDCCH includes Control Channel Elements (CCEs). One CCE includes 9 REGs.

A UE is configured to confirm $M^{(L)}$ (≥L) CCEs which are arranged successively or in a specific pattern to confirm whether a PDCCH including L CCEs is transmitted to the UE. The UE must consider L in order to receive the PDCCH and a value of L may be plural. A CCE set, which the UE must confirm to receive the PDCCH, is referred to as a search space. For example, the LTE system defines the search space as indicated in Table 1.

TABLE 1

| Type | Search space $S_k^{(L)}$ | | Number of PDCCH candidates $M^{(L)}$ | DCI formats |
|---|---|---|---|---|
| | Aggregation level L | Size [in CCEs] | | |
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

Where the CCE Aggregation level L indicates the number of CCEs constituting a PDCCH, $S_k^{(L)}$ indicates a search space of the CCE Aggregation level L, $M^{(L)}$ indicates the number of PDCCH candidates to be monitored in the search space of the Aggregation level L.

The search space may be divided into a UE-specific search space in which access to only a specific UE is allowed and a common search space in which access to all UEs in the cell is allowed. The UE monitors a common search space having a CCE Aggregation level of 4 and 8 and a UE-specific search space having a CCE Aggregation level of 1, 2, 4, and 8. The common search space and the UE-specific search space may overlap.

In addition, the location of the first CCE (having the smallest index) in a PDCCH search space given to any UE for each CCE Aggregation level value is changed every subframe according to the UE. This is referred to as PDCCH search space hashing.

Figure 7:
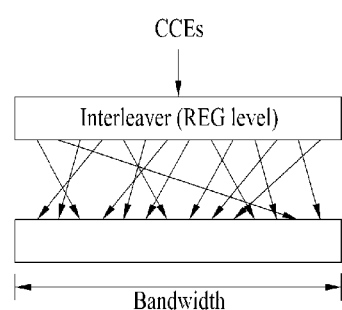
FIG. 7 is a view showing an example of dispersing Control Channel Elements (CCEs) to a system band.

FIG. 7 is a view showing an example of dispersing CCEs to a system band. Referring to FIG. 7, a plurality of logically successive CCEs is input to an interleaver. The interleaver functions to mix the input CCEs in units of REGs. Consequently, a frequency/time resource constituting one CCE is physically distributed in a control region of a subframe in a state of being dispersed in the entire frequency/time domain. Eventually, although the control channel is constituted in units of CCEs, interleaving is performed in units of REGs, thereby maximizing frequency diversity and interference randomization.

Figure 8:
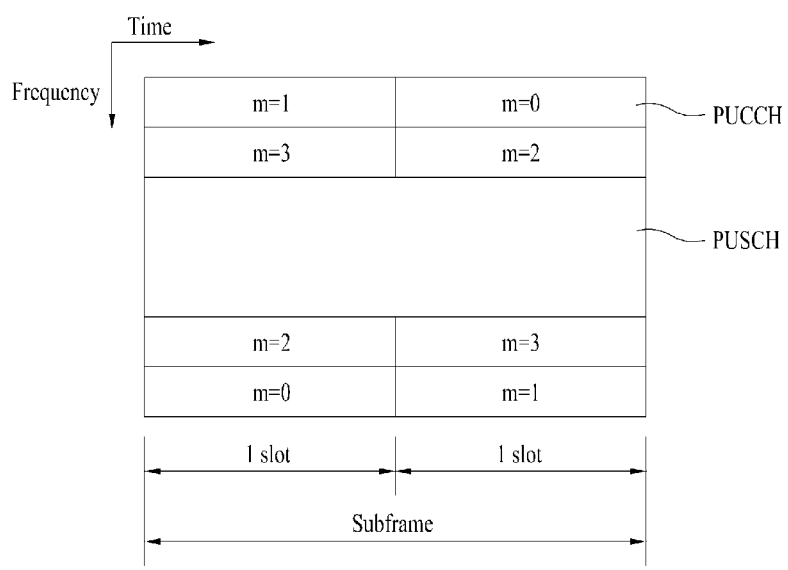
FIG. 8 is a view showing the structure of an uplink subframe used in an LTE system.

FIG. 8 is a view showing the structure of an uplink subframe used in an LTE system.

Referring to FIG. 8, the uplink subframe may be divided in to a region to which a Physical Uplink Control CHannel (PUCCH) carrying control information is allocated and a region to which a Physical Uplink Shared CHannel (PUSCH) carrying user data is allocated. The middle part of the subframe is allocated to the PUSCH. In the frequency domain, both side parts of the data region are allocated to the PUCCH. Control information transmitted on the PUCCH includes ACK/NACK used for HARQ, a Channel Quality Indicator (CQI) indicating a downlink channel state, a Rank Indicator (RI) for MIMO, and Scheduling Request (SR), which is an uplink resource allocation request. A PUCCH for one UE uses one resource block occupying different frequencies in each slot of a subframe. That is, two resource blocks allocated to the PUCCH are frequency hopped at a slot interface. In particular, FIG. 7 exemplarily shows that a PUCCH having m of 0, a PUCCH having m of 1, a PUCCH having m of 2, and a PUCCH having m of 3 are allocated to a subframe.

Figure 9:
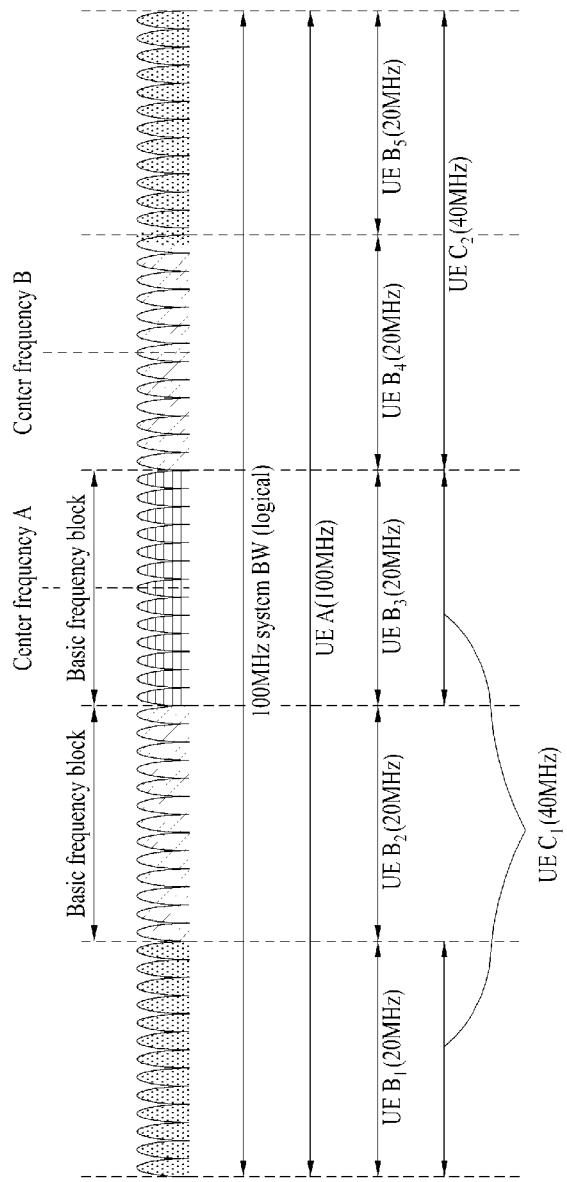
FIG. 9 is a conceptual view illustrating a carrier aggregation technique.

Hereinafter, a carrier aggregation technique will be described. FIG. 9 is a conceptual view illustrating a carrier aggregation technique.

Carrier aggregation refers to a method of a UE using a plurality of frequency blocks including uplink resources (or component carriers) and/or downlink resources (or component carriers) or a plurality of (logical) cells as a large logical frequency band in order to use a wider frequency band in a wireless communication system. Hereinafter, the term "component carriers" will be used for the convenience of description.

Referring to FIG. 9, an entire system band is a logical band having a maximum bandwidth of 100 MHz. The entire system band includes five component carriers (CCs) and each CC has a maximum bandwidth of 20 MHz. The CC includes one or more physically contiguous subcarriers. Although all CCs have the same bandwidth in FIG. 9, this is only illustrative and the CCs may have different bandwidths. In addition, although the CCs are shown as being contiguous in the frequency domain, the drawing merely shows the logical concept and thus the CCs may be physically contiguous or separated.

Different center frequencies may be used for the CCs or one common center frequency may be used for physically contiguous CCs. For example, in FIG. 9, on the assumption that all CCs are physically contiguous, a center frequency A may be used. In addition, on the assumption that the CCs are not physically contiguous, a center frequency A, a center frequency B, etc. may be used for the respective CCs.

In this specification, the CC may correspond to a system band of a legacy system. By defining the CC based on the legacy system, it is possible to facilitate backward compatibility and system design in a wireless communication environment in which an evolved UE and a legacy UE coexist. For example, in a case in which an LTE-A system supports carrier aggregation, each CC may correspond to a system band of the LTE system. In this case, the CC may have any one selected from among bandwidths of 1.25, 2.5, 5, 10, and 20 MHz.

In a case in which the entire system band is extended by carrier aggregation, a frequency band used for communication with each UE is defined in CC units. UE A may use 100 MHz which is the bandwidth of the entire system band and perform communication using all five CCs. UEs $B_1$ to $B_5$ may only use a bandwidth of 20 MHz and perform communication using one CC each. UEs $C_1$ and $C_2$ may use a bandwidth of 40 MHz and perform communication using two CCs each. The two CCs may be logically/physically contiguous or discontiguous. UE $C_1$ uses two discontiguous CCs and UE $C_2$ uses two contiguous CCs.

While one downlink component carrier and one uplink component carrier are used in an LTE system, several component carriers may be used in an LTE-A system as shown in FIG. 9. At this time, a scheme of a control channel scheduling a data channel may be divided into an existing linked carrier scheduling scheme and an existing cross carrier scheduling scheme.

More specifically, in the linked carrier scheduling scheme, a control channel transmitted via a specific CC schedules only a data channel via the specific CC, similarly to an existing LTE system using a single CC.

In the cross carrier scheduling scheme, on the other hand, a control channel transmitted via a primary CC using a carrier indicator field (CIF) schedules a data channel transmitted via the primary CC or another CC.

Figure 10:
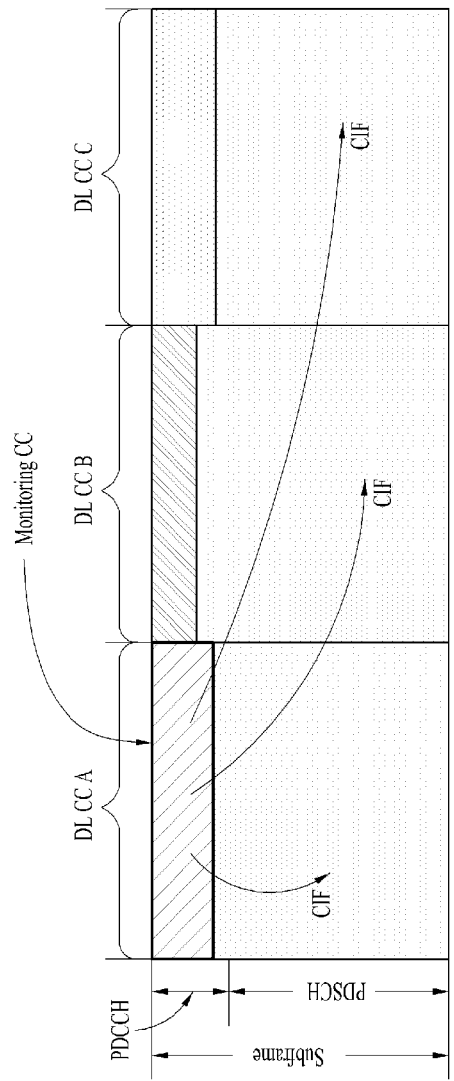
FIG. 10 is a view showing an example of applying a cross carrier scheduling technique.

FIG. 10 is a view showing an example of applying a cross carrier scheduling technique. In particular, in FIG. 10, the number of cells (or component carriers) allocated to a relay node is 3 and the cross carrier scheduling technique is performed using a CIF as described above. It is assumed that downlink cell (or component carrier) #A is a primary downlink component carrier (i.e. a Primary Cell; PCell) and the other component carriers, i.e. component carrier #B and component carrier #C, are secondary component carriers (i.e. Secondary Cells; SCells).

Hereinafter, a description will be given of a method of signal transmission and reception between a UE and an eNB in a wireless communication system to which a carrier aggregation technique using an unlicensed band according to the present invention is applied.

<First Embodiment>

First, in a case in which a predetermined preamble between the eNB and the UE is located at the front end of each subframe, the UE may receive the preamble to determine whether a corresponding subframe is set in uplink or downlink.

For example, the preamble is located at the same resource in all subframes and includes information having a minimum size of 1 bit to indicate the direction for which the corresponding subframe is set (for example, uplink or downlink). The eNB and the UE perform downlink communication or uplink communication according to the structure of the subframe decided by the preamble.

In addition, enabling of the unlicensed band may be decided based on a carrier sensing (CS) operation. The above-described preamble may indicate that the unlicensed band is in an IDLE state. In addition, the preamble may be transmitted only in a state in which the unlicensed band is in an IDLE state.

Figure 11:
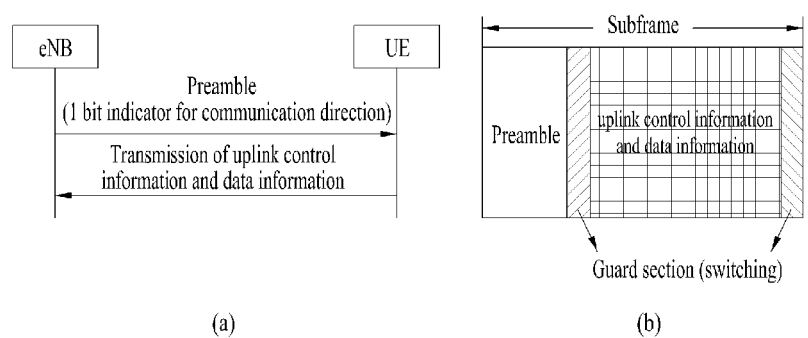
FIG. 11 is a view showing an uplink transmission procedure according to a first embodiment of the present invention and the structure of an uplink subframe therefor.

FIG. 11 is a view showing an uplink transmission procedure according to a first embodiment of the present invention and the structure of an uplink subframe therefor.

Referring to FIG. 11, in a case in which a communication direction of a corresponding subframe is set to uplink, a guard section or guard time ($G_p$) for switching between transmission and reception modes is located after a preamble. For example, in the guard time, the UE may perform Rx-Tx switching and the eNB may perform Tx-Rx switching.

In addition, the UE must receive a preamble in the next subframe. For this reason, a guard time for switching between transmission and reception modes (for example, Tx-Rx switching) is located at the end of the current subframe. In a case in which propagation delay ($T_p$) is large, the guard time may be lengthened and thus may be located over several symbol positions.

Figure 12:
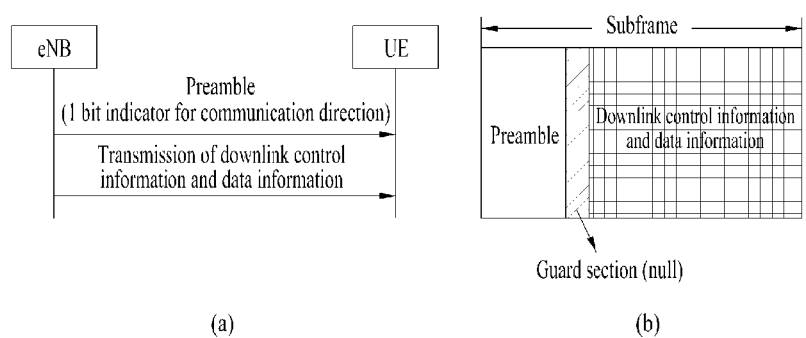
FIG. 12 is a view showing a downlink transmission procedure according to a first embodiment of the present invention and the structure of a downlink subframe therefor.

FIG. 12 is a view showing a downlink transmission procedure according to a first embodiment of the present invention and the structure of a downlink subframe therefor.

Referring to FIG. 12, in a case in which a communication direction of a corresponding subframe is set to downlink, Rx-Tx switching is not needed, unlike in uplink, but a guard time may be located after a preamble like the uplink subframe. At this time, the UE may not be allowed to transmit any signal in the corresponding guard time. This structure equally maintains the positions of resources at which transmission and reception of data are initiated in the downlink subframe and the uplink subframe such that the UE may transmit or receive data in a fixed state.

Figure 13:
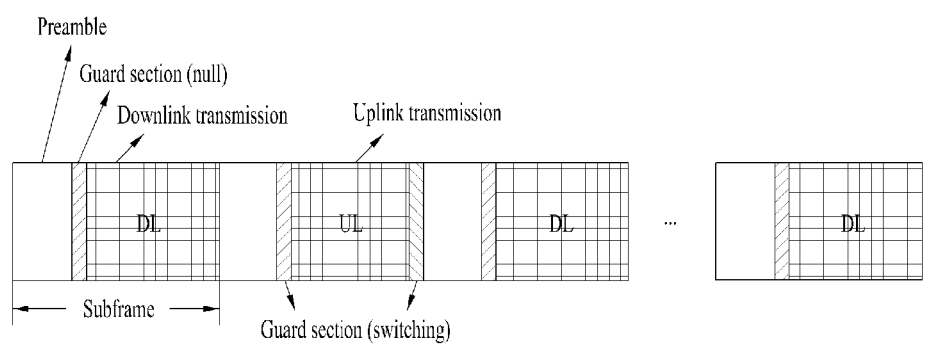
FIG. 13 is a view exemplarily showing configuration of a subframe configured using the structures of the subframes of FIGS. 11 and 12 according to a first embodiment of the present invention.

FIG. 13 is a view exemplarily showing configuration of a subframe configured using the structures of the subframes of FIGS. 11 and 12 according to a first embodiment of the present invention.

Figure 14:
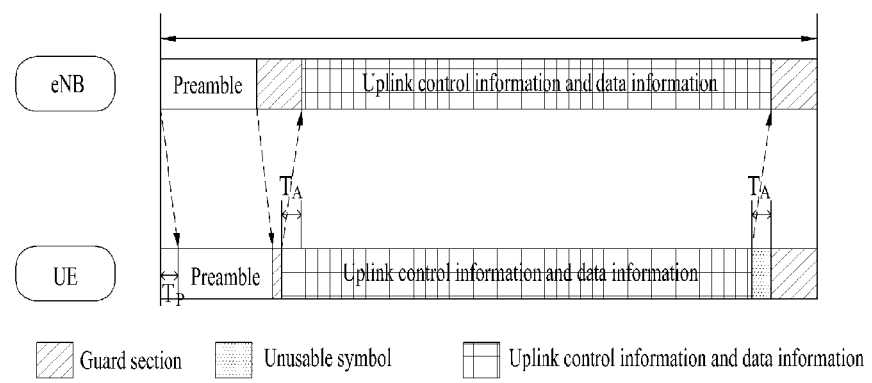
FIG. 14 is a view showing an example of performing uplink data transmission according to a first embodiment of the present invention.

Next, FIG. 14 is a view showing an example of performing uplink data transmission according to a first embodiment of the present invention. In particular, FIG. 14 shows an example of the UE performing uplink data transmission, i.e. PUSCH transmission, using the structure of the uplink subframe of FIG. 11 when $T_p$ is present between the eNB and the UE.

Referring to FIG. 14, the UE transmits uplink data in the order of 1. Confirmation of use of a corresponding subframe after decoding of a preamble ->2. Rx-Tx switching ->3. Uplink data transmission using timing advance $T_A$. In particular, $T_A$ of FIG. 13 has the same value as $T_p$. As the $T_A$ (=$T_p$) value increases, the number of symbols that can be used for uplink data transmission may relatively decrease. The above-described guard time ($G_p$) may be used for $T_A$.

In addition, the eNB may inform the UE of timing retreat ($T_R$) information as another method of informing the UE of uplink data transmission time, i.e. PUSCH transmission time. $T_R$ is a value indicating how far from the preamble reception time uplink data transmission is initiated and may be expressed as a number of symbols or time units. In addition, the eNB may inform the UE of $T_R$ through higher layer signaling or may inform the UE of an uplink grant or downlink control information to transmit downlink allocation information in a state of adding a specific field thereto. Alternatively, a method of reusing a field that is not (currently) used or a codepoint state for existing downlink control information may be considered.

In a case in which a specific field for $T_R$ is added to downlink control information to transmit downlink allocation information, the eNB may transmit the downlink control information from the nearest downlink subframe before an uplink subframe in which actual uplink data transmission is performed to the UE.

In addition, in a case in which a field that is not (currently) used or a codepoint state is reused for existing downlink control information, $T_R$ corresponding to the specific field or the codepoint state may be implemented by previously sharing a corresponding table (or set information) between the eNB and the UE.

<Second Embodiment>

In a case in which an unlicensed band is used based on a carrier sensing operation in a wireless communication system to which a carrier aggregation technique is applied, an eNB may previously inform a UE of presence and location of an uplink subframe (or an uplink subframe and a downlink subframe) through higher layer signaling. For example, the eNB may inform the UE of information regarding configuration of an uplink/downlink subframe effective during a section T having a constant length through higher layer signaling.

Hereinafter, information regarding configuration of an uplink/downlink subframe effective during a section T having a constant length will be referred to as message X for the convenience of description.

In addition, a predetermined value between the eNB and the UE may be used as the T value or the eNB may inform the UE of the T value together with message X through additional higher layer signaling, i.e. message Y. Message X and message Y may be updated based on a predetermined specific period value. In addition, message X (or message Y) may be transmitted from the eNB to the UE through a downlink primary component carrier in a licensed band or through downlink transmission in an unlicensed band.

In addition, a method of conforming application initiation points of message X between the eNB and the UE with each other when the UE receives both message X and message Y or only message X from the eNB at a specific time, e.g. SF #a, may be considered as the following cases A) to C).

A) A specific sequence selected from among a total of N sequences that can be used as a preamble may be designated as start sequence X, which may be used to inform an application start point of message X. For example, the UE, receiving start sequence X from the eNB at SF #b (where b≥a or b>a), performs unlicensed band-based communication with the eNB during the section T from SF #b based on message X received at SF #a and, during a subsequent section T−1 except SF #b, the UE may not expect reception of a preamble indicating the use of a subframe from eNB.

Meanwhile, start sequence X designated to inform an application start point of message X may be used to inform the use of a corresponding subframe, i.e. whether the corresponding subframe is an uplink subframe or a downlink subframe, in addition to the above-mentioned use.

Figure 15:
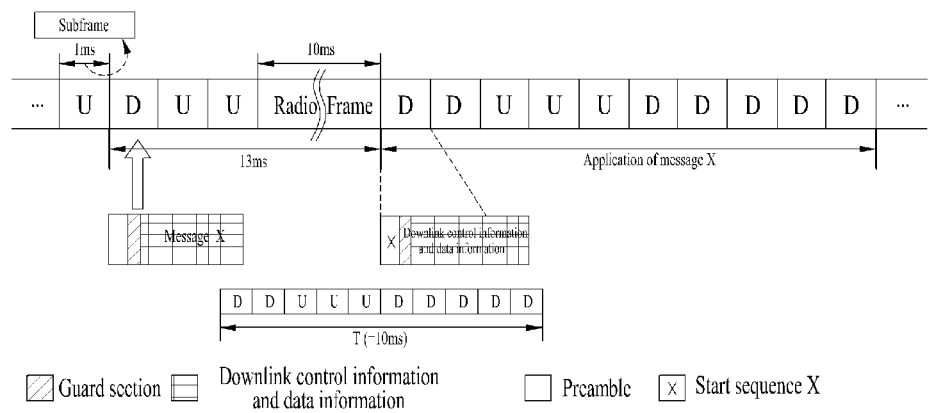
FIG. 15 is a view showing an example of applying configuration of a subframe according to a second embodiment of the present invention.

FIG. 15 is a view showing an example of applying configuration of a subframe according to a second embodiment of the present invention.

Referring to FIG. 15, the technique of A) is applied and it is assumed that T is a predetermined value of 10 ms between an eNB and a UE. In addition, configuration of an uplink/downlink subframe is signaled as [DDUUUDDDDD] through message X. Afterwards, message X is applied from a point in a time when start sequence X is received.

B) When the UE receives both message X and message Y or only message X from the eNB at a specific time, e.g. SF #a, a time when message X is actually applied may be defined as $T_{offset}$. $T_{offset}$ is expressed in slot units, in subframe units, or in radio frame units (or in the number of (receive) preambles). $T_{offset}$ may be set to a specific value of 1 or more. A predetermined value between the eNB and the UE may be used as $T_{offset}$ or the eNB may inform the UE of $T_{offset}$ together with message X through additional higher layer signaling (for example, message Z).

A reference point of $T_{offset}$ may be designated as the previous or next nearest slot interface including SF #a, at which message X has been received, a subframe interface, or a radio frame interface. This may be preset between the eNB and the UE. Alternatively, a reference point of $T_{offset}$ may be designated as a first symbol of a previous specific radio frame, such as a radio frame of SFN #0, including SF #a, at which message X has been received. In addition, $T_{offset}$ may be counted as the number of subsequently received preambles including SF #a, at which message X has been received.

Meanwhile, the UE does not expect reception of a reference signal, such as CRS, for measurement (for example, RSRQ, RSRP, and RLM) from the eNB in an unlicensed band after the section T elapses from the application start point of message X and, also, does not perform a measurement operation.

Figure 16:
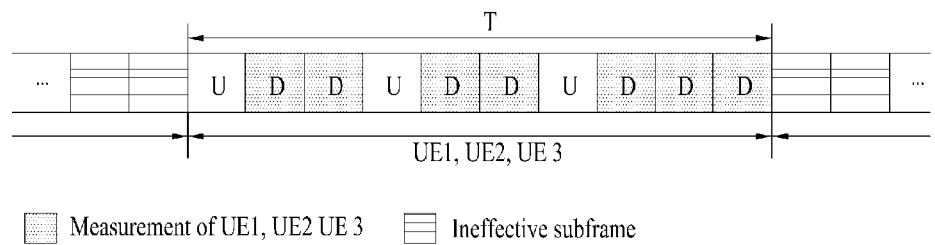
FIG. 16 is a view showing an example of a UE performing measurement in a configured downlink subframe only during a time section T from a message X application start point thereof according to a second embodiment of the present invention.

FIG. 16 is a view showing an example of a UE performing measurement in a DL subframe configured by message X only for a period of time T from a message X application start point thereof according to a second embodiment of the present invention. In particular, in FIG. 16, it is assumed that an uplink/downlink subframe is configured as [UDDUD-DUDDD].

In FIG. 16, it is assumed that the total number of UEs is 3. The UEs perform measurement in a downlink subframe configured by message X only during the section T from an application start point of message X and do not perform measurement in the other downlink subframes, i.e. ineffective subframes.

C) Upon determining that a result of the carrier sensing operation in the unlicensed band is IDLE for a time "T_IDLE", the eNB (or the UE) assumes that the corresponding unlicensed band may be used in uplink communication or downlink communication.

Figure 17:
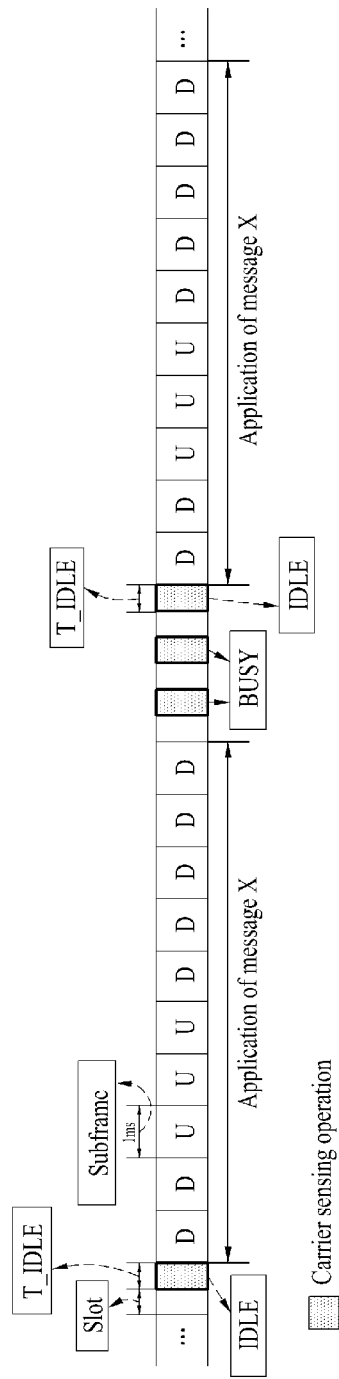
FIG. 17 is a view showing another example of applying configuration of a subframe according to a second embodiment of the present invention.

FIG. 17 is a view showing another example of applying configuration of a subframe according to a second embodiment of the present invention. It is assumed that configuration of message X in FIG. 17 is identical to that in FIG. 15 and that a carrier sensing operation is performed from a start point of the second slot (based on a slot (or subframe) interface in a licensed band).

Referring to FIG. 17, the eNB (or the UE) may set a point at which it is determined that a result of the carrier sensing operation is IDLE for a time "T_IDLE" as the application point of message X. In addition, the point at which the eNB (or the UE) performs the carrier sensing operation may be predefined or additionally informed through higher layer signaling.

<Third Embodiment>

Meanwhile, in a case in which an eNB informs a UE of message X effective during a predetermined time section T through higher layer signaling, the eNB may designate a portion of a specific subframe selected from among several subframes constituting message X to perform a carrier sensing operation. A portion of a specific subframe may be a second slot region of the last one of the several subframes corresponding to the predetermined period of time T. The eNB and the UE do not use the corresponding region in downlink communication and uplink communication. At this time, PDSCH/PUCSH transmitted from the corresponding subframe may be rate matched or punctured in consideration of the reduced number of symbols.

In addition, the eNB (or the UE) may set the carrier sensing operation with respect to the unlicensed band only in the corresponding region designated to perform the carrier sensing operation on the assumption that uplink/downlink configuration in the section T is repeatedly applied from the first subframe of radio frame #0.

Alternatively, a portion of the specific subframe designated to perform a carrier sensing operation may be set as a symbol portion having a latter half size of the final symbol of the last subframe corresponding to the section T. In this case, if the UE must transmit an SRS using the final symbol of the corresponding last subframe, the SRS may be limited such that the SRS is transmitted using only a former half symbol portion of the final symbol. The SRS transmitted using only the former half symbol portion of the final symbol may be referred to as a "Reduced Length SRS" or a "Shortened SRS".

In addition, when a portion of a specific subframe is designated to perform a carrier sensing operation, the eNB may inform the UE of information regarding location of the portion of the specific subframe together with message X through higher layer signaling or through an (existing or new) specific field of downlink control information signaled through a physical control channel.

A portion of a specific subframe designated to perform a carrier sensing operation as described above may be designated in various units, such as slots, subframes, and symbols. Such information may be relevant information shared between the eNB and the UE, the eNB may inform the UE of such information through higher layer signaling, or the eNB may inform the UE of such information through an (existing or new) specific field of downlink control information signaled through a physical control channel.

For example, upon determining that a result of the eNB performing a carrier sensing operation with respect to an unlicensed band in the second slot region of the final subframe, i.e. SF #n, designated to the carrier sensing operation is IDLE for a time "T_IDLE", the eNB may use the unlicensed band during the section T (i.e. SF #(n+1) to SF #(n+T)) from SF #(n+1). In configuring an uplink/downlink subframe applied during the section T from SF #(n+1), existing configuration of an uplink/downlink subframe may be used without change or new configuration of an uplink/downlink subframe that the eNB informs the UE of through additional higher layer signaling.

In addition, upon determining that the result of the eNB performing the carrier sensing operation with respect to the unlicensed band in the second slot region of the final subframe, i.e. SF #n, designated to the carrier sensing operation is BUSY, the eNB may not use the unlicensed band during the section T (i.e. SF #(n+1) to SF #(n+T)) from SF #(n+1). The eNB does not perform both uplink communication and downlink communication during the section T during which the unlicensed band is not used and may not perform even the carrier sensing operation in the remaining regions except for the region designated to perform the carrier sensing operation. Time for which the eNB does not use the unlicensed band may be set using various values in addition to T and the eNB may inform the UE of a corresponding value through a specific field of a physical control channel or higher layer signaling. For example, it the eNB informs the UE of the corresponding value through higher layer signaling, the corresponding value may be transmitted together with message X.

In addition, the eNB may inform each UE or UEs set as a specific group of the maximum number of times (T_max) for which configuration of an uplink/downlink subframe in the section T may be used through higher layer signaling. In one embodiment, a T_max value for each UE or UEs (set as a specific group) may decrease by 1 when configuration of an uplink/downlink subframe in the section T is used. In a case in which the eNB selects UEs (or UEs of the specific group) using configuration of the uplink/downlink subframe in the section T at a specific time, priority may be given to UEs having relatively higher T_max values. In addition, the T_max value for each UE (or UEs of the specific group) may be updated based on a predetermined period value.

Figure 18:
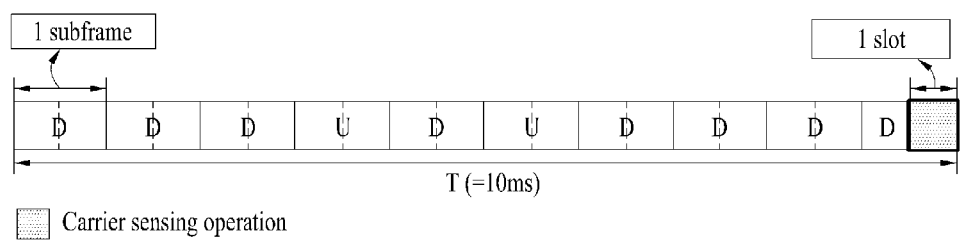
FIG. 18 is a view showing an example of configuring a specific region to perform a carrier sensing operation according to a third embodiment of the present invention.

FIG. 18 is a view showing an example of configuring a specific region to perform a carrier sensing operation according to a third embodiment of the present invention. In particular, in FIG. 18, it is assumed that an uplink/downlink subframe of message X is configured as [DDDUDUDDDD].

Referring to FIG. 18, a predetermined value between an eNB and a UE is used as T. In this drawing, T is set to 10 ms, i.e. one radio frame. In addition, it is assumed that a second slot region of the last one of several subframes constituting message X is designated to perform a carrier sensing operation.

Figure 19:
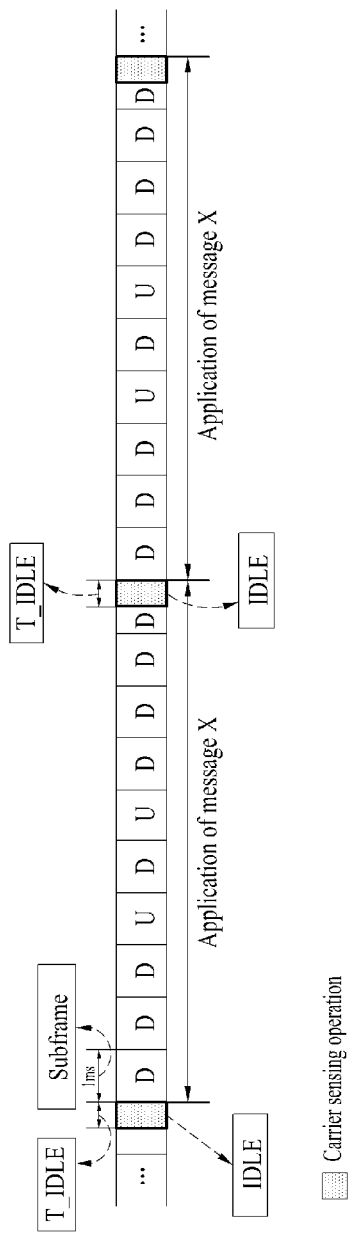
FIG. 19 is a view showing another example of configuring a specific region to perform a carrier sensing operation according to a third embodiment of the present invention.

FIG. 19 is a view showing another example of configuring a specific region to perform a carrier sensing operation according to a third embodiment of the present invention. In particular, in FIG. 19, it is assumed that an eNB (or a UE) performs a carrier sensing operation with respect to an unlicensed band only in a corresponding region designated to perform the carrier sensing operation (i.e. a second slot region of the final subframe, i.e. SF #n, corresponding to a section T) on the assumption that uplink/downlink subframe configuration in the section T is repeatedly applied from the first subframe of radio frame #0. In addition, in FIG. 19, it is assumed that an uplink/downlink subframe of message X is configured as [DDDUDUDDDD] in the same manner as in FIG. 18.

Referring to FIG. 19, upon determining that a result of the eNB performing the carrier sensing operation with respect to the unlicensed band in the second slot region of the final subframe, i.e. SF #n, corresponding to the section T is IDLE for a time "T_IDLE", the eNB may use the unlicensed band during the section T, i.e. SF #(n+1) to SF #(n+T), from SF #(n+1). Although it is assumed that T_IDLE is a length of one slot (=0.5 ms), T_IDLE may be set to other values. The T_IDLE value may be a predetermined value shared between the eNB and the UE or the eNB may inform the UE of the T_IDLE value through higher layer signaling.

Figure 20:
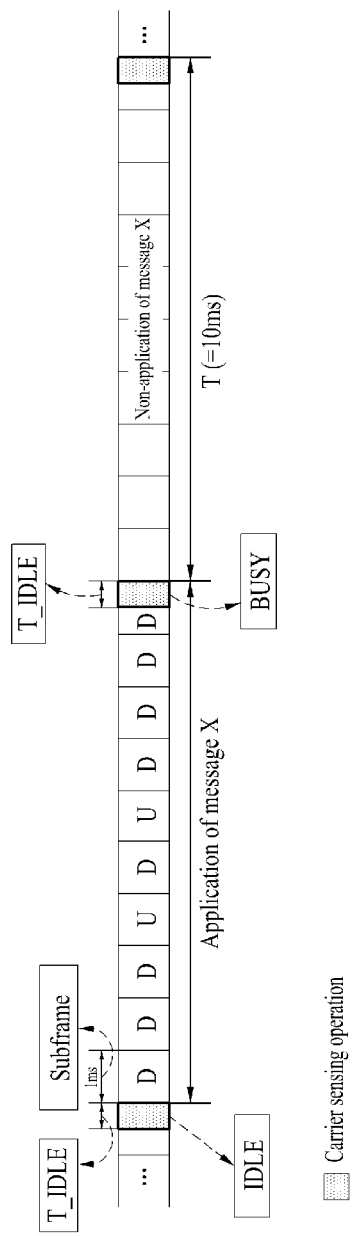
FIG. 20 is a view showing a further example of configuring a specific region to perform a carrier sensing operation according to a third embodiment of the present invention.

FIG. 20 is a view showing a further example of configuring a specific region to perform a carrier sensing operation according to a third embodiment of the present invention. In FIG. 20, it is also assumed that an eNB (or a UE) performs a carrier sensing operation with respect to an unlicensed band only in a corresponding region designated to perform the carrier sensing operation (i.e. a second slot region of the final subframe, i.e. SF #n, corresponding to a section T) on the assumption that uplink/downlink subframe configuration in the section T is repeatedly applied from the first subframe of radio frame #0. In addition, in FIG. 20, it is assumed that an uplink/downlink subframe of message X is configured as [DDDUDUDDDD] in the same manner as in FIG. 19.

Referring to FIG. 20, upon determining that a result of the eNB performing the carrier sensing operation with respect to the unlicensed band in the second slot region of the final subframe, i.e. SF #n, corresponding to the section T is BUSY, the eNB may not use the unlicensed band during the section T (SF #(n+1) to SF #(n+T)) from SF #(n+1). Although it is assumed that T_IDLE is a length of one slot (=0.5 ms), T_IDLE may be set to other values. The T_IDLE value may be a predetermined value shared between the eNB and the UE or the eNB may inform the UE of the T_IDLE value through higher layer signaling (or physical layer signaling).

<Fourth Embodiment>

In a case in which a carrier aggregation technique is applied using an unlicensed band, if configuration of an uplink/downlink subframe with respect to the unlicensed band is dynamically changed, an uplink grant transmission time (or a downlink allocation information transmission time) and a relationship between an uplink grant reception time and a PUSCH transmission time (or a relationship between a downlink allocation information reception time and a PDSCH transmission time) may not be preset as in the conventional art.

In this case, an eNB may transmit an uplink grant to a UE at SF #n and then transmit an additional uplink grant enabling message to enable the uplink grant to the UE at SF #k (where k≥(n+4)) such that the UE may perform uplink data transmission (i.e. PUSCH transmission) based on the previously received uplink grant. Alternatively, the eNB may transmit downlink allocation information to the UE at SF #n and then transmit an additional downlink allocation enabling message to enable the downlink allocation information to the UE at SF #k (where k≥n or k>n) such that the UE may perform downlink data reception (i.e. PUSCH reception) based on the previously received downlink allocation information.

The time when the eNB transmits the uplink grant enabling message to the UE may be SF #(n+4) or SF #k (where k>(n+4)) available after SF #(n+4). In addition, the time when the UE having received the uplink grant enabling message from the eNB at SF #k performs uplink data transmission, i.e. PUSCH transmission, may be the same time as when the uplink grant enabling message is received, i.e. SF #k, or a first time SF #(k+1) after SF #k at which the uplink grant enabling message is received.

In a case in which PUSCH transmission is performed at a first time SF #(k+1) after SF #k at which the uplink grant enabling message is received, a downlink subframe, to which the uplink grant enabling message is transmitted, may use a subframe having a short length such as DwPTS or a special subframe. When the UE performs PUSCH transmission in a condition that propagation delay ($T_p$) is present between the eNB and the UE, PUSCH transmission having $T_A$ applied thereto may be guaranteed. In this method, the eNB may implicitly inform the UE that SF #(k+1) is used for the UL subframe. At the corresponding UL subframe (i.e. SF #(k+1)), a preamble indicating the use of the subframe may not be transmitted.

Meanwhile, a DL subframe, which does not use the final symbol, or one or more symbols of the downlink subframe may be defined as a short DL subframe. Such a short downlink subframe may be set to guarantee $T_A$ of an uplink subframe when a subframe after the short downlink subframe is used as the uplink subframe given that $T_p$ is present between the eNB and the UE. In addition, the short downlink subframe may be a means for the eNB to implicitly inform the UE that a subframe after the short downlink subframe is used as an uplink subframe. At the corresponding UL subframe, a preamble indicating use of the subframe may not be transmitted. In addition, in a case in which the short downlink subframe is used, the UE may operate in a state in which the UE changes the subframe interface from the uplink subframe after the short downlink subframe by $T_A$.

Figure 21:
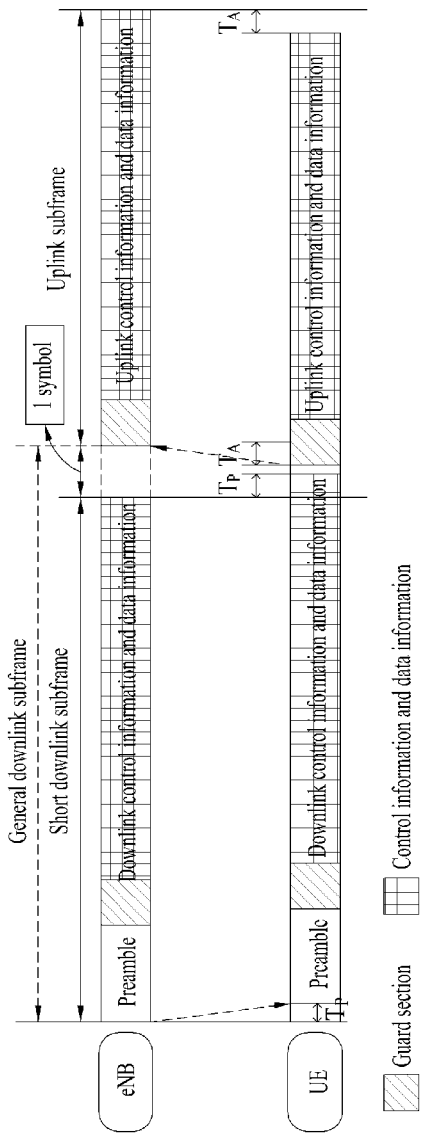
FIG. 21 is a view showing an example of applying a short downlink subframe according to a fourth embodiment of the present invention.

FIG. 21 is a view showing an example of applying a short downlink subframe according to a fourth embodiment of the present invention. In particular, in FIG. 21, the short downlink subframe is set not to use the final symbol of a general downlink subframe and it is assumed that a subframe after the short downlink subframe is implicitly used as an uplink subframe. In addition, it is assumed that, at the uplink subframe after the short downlink subframe, a preamble indicating use of the corresponding subframe is not transmitted.

An interlocking relationship between PUSCH transmission based on the uplink grant and PUSCH transmission based on the uplink grant enabling message may be implemented as follows.

First, the specific number of sequences selected from among a total of N sequences that can be used as preambles (sequences recognized by an eNB and a UE) may be used as preambles of subframes for uplink grant transmission and uplink grant enabling messages. For example, on the assumption that sequence B selected from the specific number of sequences is used as a preamble of SF #x to which the uplink grant is transmitted, if an uplink grant enabling message is transmitted to sequence B used as the preamble of SF #x at SF #y (where y≥(x+4)), the UE performs PUSCH transmission based on the received uplink grant of SF #x at SF #y or SF #(y+1).

Otherwise, index information of a downlink subframe to which an uplink grant has been transmitted may be included in a sequence uses as a preamble of a subframe for uplink grant transmission and an uplink grant enabling message. Consequently, the UE performs PUSCH transmission based on the received uplink grant received at the corresponding downlink subframe based on the index information of the downlink subframe.

Information regarding sequences selected from among a total of N sequences that are used as preambles of subframes for uplink grant transmission and uplink grant enabling messages may be configured by sharing between the eNB and the UE.

In addition, start points of enabling of a previously transmitted UL grant and PUSCH transmission based thereon can be variable, not fixed as in the subframe interface, as a result of "contention for medium access" in an unlicensed band. In particular, a case in which the uplink grant enabling message is transmitted using the same structure as the preamble in the unlicensed band corresponds to this case. In addition to PUSCH transmission as described above, a start point of PDSCH transmission may be variable, not fixed as in the subframe interface, as the result of "contention for medium access" in the unlicensed band.

Figure 22:
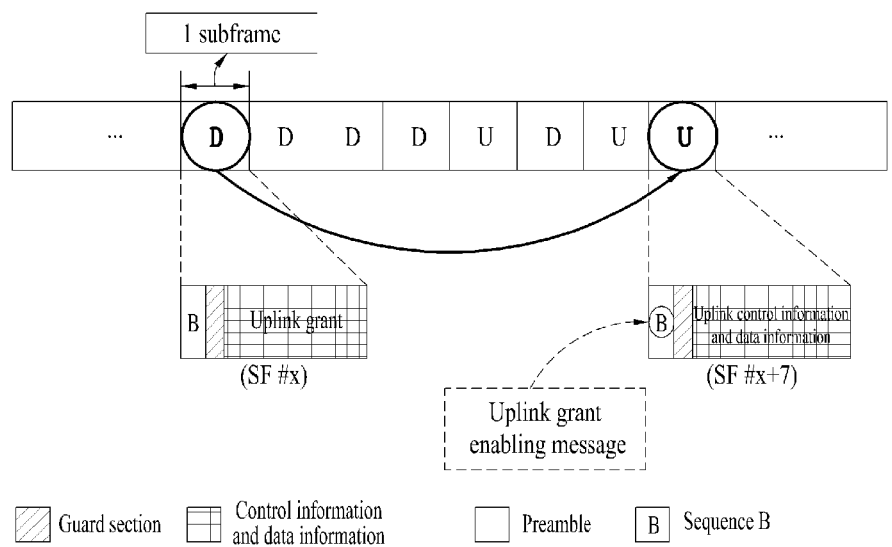
FIG. 22 is a view showing an example of using a specific sequence as a preamble of a subframe for uplink grant transmission and an uplink grant enabling message according to a fourth embodiment of the present invention.

FIG. 22 is a view showing an example of using a specific sequence as a preamble of a subframe for uplink grant transmission and an uplink grant enabling message according to a fourth embodiment of the present invention. In particular, the specific sequence is expressed as sequence B.

Referring to FIG. 22, it can be seen that, although a UE has received an uplink grant from an eNB at SF #x, a PUSCH is actually transmitted based on the uplink grant of SF #x at SF #(x+7) according to an uplink grant enabling message.

In addition, subframe index information or a subframe number counter indicating a plurality of additional subframes may be included in the uplink grant (or the preamble of the subframe for uplink grant transmission) and the uplink grant enabling message as described above. For example, if the eNB transmits the uplink grant (or the preamble of the subframe for uplink grant transmission) to the UE in a state in which N subframe indices are included therein and the same index as the subframe index (for example, one of the N subframe indices) previously transmitted through the uplink grant (or the preamble of the subframe for uplink grant transmission) is included in a subsequently transmitted uplink grant enabling message, the UE may perform PUSCH transmission based on the previously received uplink grant upon receiving the corresponding uplink grant enabling message, i.e. SF #w, or at a subsequent time SF #(w+1).

<Fifth Embodiment>

In a case in which a primary component carrier cross carrier schedules a plurality of PUSCH transmissions of a secondary component carrier (for example, an unlicensed band) in a wireless communication system to which a carrier aggregation technique is applied, an uplink grant transmitted through a downlink subframe, i.e. a PDCCH, of the primary component carrier may not include information regarding a plurality of subframe indices (of the secondary component carrier). That is, subframe index information corresponding to a downlink subframe of the primary component carrier to which a previous uplink grant has been transmitted may included in an uplink grant enabling message such that a UE performs a plurality of PUSCH transmissions of the secondary component carrier based on the previously received uplink grant.

In addition, upon determining that a result of an eNB performing a carrier sensing operation with respect to a secondary component carrier (CC #2) in the unlicensed band is IDLE, the eNB may use CC #2 during a transmission opportunity (TxOP) section including N SFs. The eNB may previously inform the UE of an N value and the use of N subframes through higher layer signaling or physical layer signaling (for example, a downlink primary component carrier in a licensed band).

In addition, the eNB may previously transmit a preamble (or sequence) designated for this use to the UE through CC #2 in the unlicensed band in order to inform the UE of information regarding a start point of the TxOP. Information regarding an N value (i.e. length of the TxOP) or the use of N SFs may be transmitted in a state of being included in the preamble. After the preamble is transmitted, if the eNB transmits actual downlink information to the UE in a state of being matched with a subframe interface of an LTE-A system, a timing gap may be present between the preamble transmission time and the actual downlink information transmission time. In particular, CC #2 cannot be exclusively used by the corresponding eNB and UE and is used through contention based on carrier sensing. During such a timing gap, therefore, another system may attempt information transmission.

In order to prevent another system from attempting information transmission during the timing gap, therefore, the eNB may transmit a Carrier Reservation Transport Block (CRTB) through CC #2 in the unlicensed band. The CRTB means a kind of dummy information transmitted to reserve CC #2 or a copy of a portion of a PUSCH. The CRTB may be transmitted during the timing gap (for example between the preamble transmission time and the actual downlink information transmission time).

Exceptionally, in a case in which a first subframe of the TxOP section is configured for uplink information transmission, the above-described CRTB may be transmitted for a time corresponding to (an actual data transmission time—an Rx-Tx switching time of the eNB) after the preamble transmission is completed.

Figure 23:
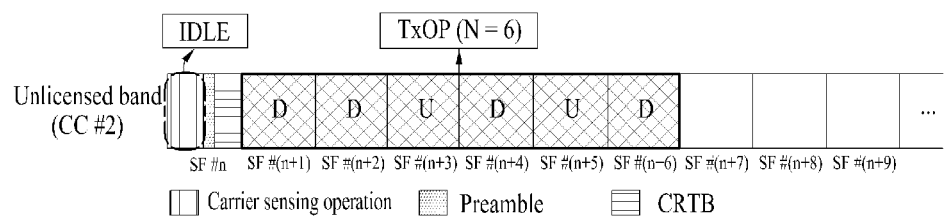
FIG. 23 is a view showing an example of using a secondary component carrier during a TxOP section including N subframes according to a fifth embodiment of the present invention.

FIG. 23 is a view showing an example of using a secondary component carrier during a TxOP section including N subframes according to a fifth embodiment of the present invention.

Referring to FIG. 23, upon determining that a result of an eNB performing a carrier sensing operation with respect to a secondary component carrier CC #2 in an unlicensed band is IDLE, the eNB may use CC #2 during a TxOP section including N SFs. It this case, it is assumed that the eNB previously informs a UE of an N value set to 6 and the use of the SFs set to [DDUDUD] through higher layer signaling.

When the UE receives an uplink grant with respect to CC #2 in an unlicensed band from the eNB at SF #n of a primary component carrier CC #1 in a licensed band through a PDCCH according to cross carrier scheduling under the condition of FIG. 23, in a case in which PUSCH transmission interlocked with the corresponding uplink grant is performed in the TxOP section, the eNB does not transmit an uplink grant enabling message to enable the corresponding uplink grant to the UE. In addition, in this case, the UE also does not expect reception of the uplink grant enabling message to enable the corresponding uplink grant from the eNB and performs PUSCH transmission based on the uplink grant at a PUSCH transmission time (i.e. UL SF #(n+k)) interlocked with an uplink grant reception time (i.e. DL SF #n). The PUSCH transmission time (i.e. UL SF #(n+k)) interlocked with the uplink grant reception time (i.e. DL SF #n) may be used according to a predetermined rule (for example, k=4).

In another mode, the PUSCH transmission time (i.e. UL SF #(n+k)) interlocked with the uplink grant reception time (i.e. DL SF #n) may be defined to follow the next nearest uplink available subframe including SF #(n+4). The PUSCH transmission time (i.e. UL SF #(n+k)) interlocked with the uplink grant reception time (i.e. DL SF #n) may be changed depending upon the use of the N SFs in the predetermined TxOP section. In addition, the above-described uplink grant enabling message may be a sequence, i.e. a preamble, (for example, transmitted to CC #2 set as the downlink component carrier in the unlicensed band) previously designated as such use or a value of a specific field transmitted through a physical control channel (for example, transmitted to CC #1 set as the downlink component carrier in the licensed band).

On the other hand, when the UE receives an uplink grant with respect to CC #2 in an unlicensed band from the eNB at SF #n of a primary component carrier CC #1 in a licensed band through a PDCCH according to cross carrier scheduling, in a case in which PUSCH transmission interlocked with the corresponding uplink grant is performed out of the TxOP section, the eNB may transmit an uplink grant enabling message to enable the corresponding uplink grant to the UE. In addition, in this case, the UE also expects reception of the uplink grant enabling message to enable the corresponding uplink grant from the eNB and, upon receiving the uplink grant enabling message, performs PUSCH transmission based on a previously received uplink grant (i.e. PDCCH received at SF #n).

Figure 24:
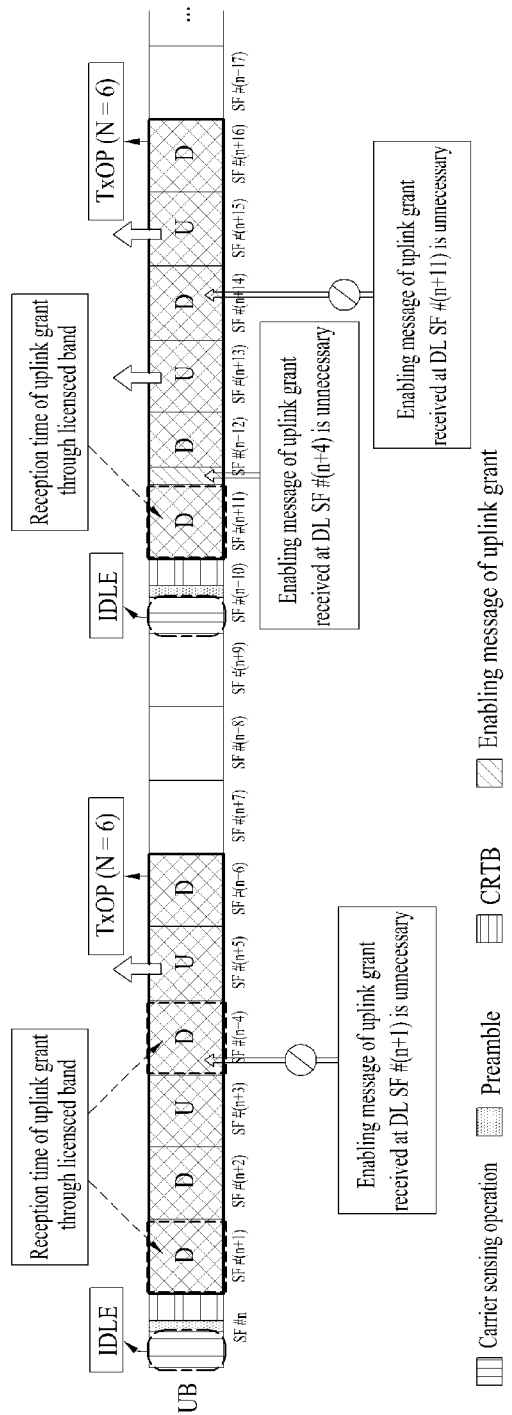
FIG. 24 is a view showing an example of performing PUSCH transmission according to a fifth embodiment of the present invention.

FIG. 24 is a view showing an example of performing PUSCH transmission according to a fifth embodiment of the present invention. In particular, in FIG. 24, it is assumed that N is set to 6 and the use of SFs is set to [DDUDUD] in the same manner as in FIG. 23. In addition, it is assumed that a UE receives an uplink grant with respect to CC #2 in an unlicensed band from an eNB at DL SF #(n+1), DL SF #(n+4), and DL SF #(n+11) of CC #1 in a licensed band according to cross carrier scheduling.

Referring to FIG. 24, PUSCH transmission interlocked with an uplink grant of DL SF #(n+1) is performed in a TxOP section, i.e. at UL SF #(n+5). Consequently, the eNB does not transmit an additional uplink grant enabling message to enable an uplink grant received at DL SF #(n+1) to the UE. In the same manner, PUSCH transmission interlocked with an uplink grant of DL SF #(n+11) is performed in a TxOP section, i.e. at UL SF #(n+15). Consequently, the eNB does not transmit an additional uplink grant enabling message to enable the uplink grant received at DL SF #(n+11) to the UE.

On the other hand, in a case in which the eNB enables an uplink grant transmitted at DL SF #(n+4) at UL SF #(n+13), not in the corresponding TxOP section, the eNB transmits an uplink grant enabling message to enable the corresponding uplink grant (i.e. DL SF #(n+4)) at DL SF #(n+12) to the UE.

In this case, it is assumed that the uplink grant enabling message specifically includes downlink subframe index information to which the uplink grant to be enabled by the eNB is transmitted. For example, the uplink grant enabling message transmitted at DL SF #(n+12) includes downlink subframe index information of DL SF #(n+4). Consequently, the UE enables the uplink grant previously received at DL SF #(n+4) at UL SF #(n+13).

In another method, the eNB and the UE may implicitly set the current uplink grant enabling message such that the current uplink grant enabling message enables the uplink grant having the earliest transmission/reception time. In addition, the eNB and the UE may implicitly set the uplink grant enabling message received at DL SF #n such that the uplink grant enabling message received at DL SF #n enables the uplink grant received at the previous nearest DL SF including DL SF #(n−4).

In a further method, in a case in which uplink transmission through CC #2 is performed based on asynchronous HARQ, the uplink grant enabling message may include (uplink) HARQ ID information enabled by the eNB. For example, the UE performs retransmission of the previous uplink transmission (for example, the same (uplink) HARQ ID) based on the HARQ ID information included in the uplink grant enabling message. In addition, retransmission of the initial uplink transmission performed in the TxOP section may be restricted such that the retransmission is performed in an uplink subframe identical (in location) to the subframe in which the initial uplink transmission has been performed (in the TxOP) when the corresponding system uses CC #2 again. That is, in FIG. 24, retransmission of UL SF #(n+5) may be performed at UL SF #(n+15).

The above methods may be extensively applied to a case in which the UE receives an uplink grant with respect to CC #2 from the eNB through a specific physical channel of CC #2 according to scheduling. A time when the UE receives an uplink grant with respect to CC #2 from the eNB through a specific physical channel of CC #2 according to scheduling may be a time when the eNB determines that a result of performing a carrier sensing operation with respect to CC #2 is IDLE.

<Sixth Embodiment>

In a case in which an eNB determines that a result of performing a carrier sensing operation with respect to CC #2 in an unlicensed band is IDLE and sets a TxOP including N SFs, all SFs constituting one specific TxOP may be configured for downlink data transmission or uplink data transmission. This method has an advantage in that it is possible to minimize the number of special SFs generated in one specific TxOP.

In addition, a length (i.e. N_DL) of a TxOP used only for DL data transmission and a length (i.e. N_UL) of a TxOP used only for UL data transmission may be set to be equal to each other or to be different from each other. In one embodiment, an eNB may inform a UE of the length of the TxOP through higher layer signaling of a primary component carrier in a licensed band or a physical channel thereof. Alternatively, the eNB may transmit information regarding the length of the TxOP and the use of the TxOP to the UE in a state of being included in a preamble (or sequence) designated to inform a start point of the TxOP transmitted through CC #2 in the unlicensed band. In addition, the eNB may inform the UE of the use of a specific TxOP through a physical channel of a primary component carrier (CC #1) in a licensed band before the TxOP is actually applied. Alternatively, the use of the specific TxOP may be sequentially set according to a predetermined use rule (sequence) of the TxOP.

Hereinafter, all subframes constituting the TxOP, the uses of which are configured for downlink data transmission and uplink data transmission, will respectively be denoted by "TxOP_DL" and "TxOP_UL" for the convenience of description.

Figure 25:
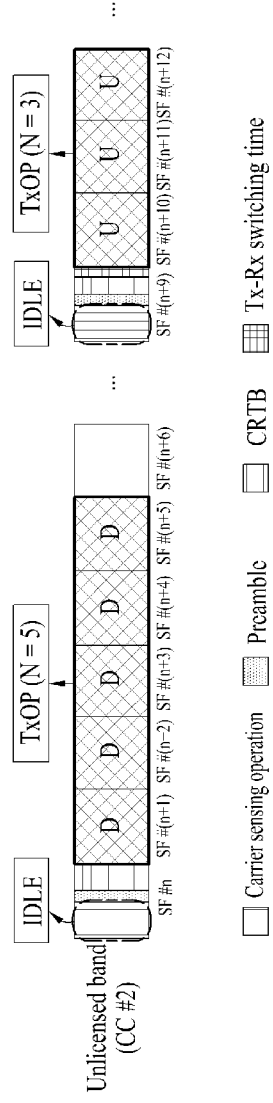
FIG. 25 is a view showing an example of configuring a TxOP according to a sixth embodiment of the present invention.

FIG. 25 is a view showing an example of configuring a TxOP according to a sixth embodiment of the present invention. In particular, in FIG. 25, it is assumed that an eNB transmits information regarding the length of the TxOP and the use of the TxOP to a UE in a state of being included (masked) in a preamble (or sequence) previously designated to inform a start point of the TxOP.

Referring to FIG. 25, a firstly set use of the TxOP and a firstly set length (i.e. N_DL) are designated as downlink data transmission (i.e. TxOP_DL) and 5, respectively, and a secondly set use of the TxOP and a secondly set length (i.e. N_DL) are designated as uplink data transmission (i.e. TxOP_UL) and 3, respectively.

After a preamble to inform the start point of the TxOP is transmitted, if actual data transmission is set to be performed according to a subframe interface of an LTE-A system, a timing gap may be present between a preamble transmission time and an actual data transmission time. In this case, the eNB also transmits a CRTB in order to prevent another system from attempting data transmission during the timing gap.

When the UE receives an uplink grant with respect to CC #2 in an unlicensed band from the eNB at SF #n of a primary component carrier CC #1 in a licensed band through a PDCCH according to cross carrier scheduling in a condition of FIG. 25, the UE may perform PUSCH transmission interlocked with the uplink grant with reference to a virtual timing index (VTI) set at the corresponding time SF #n. The following proposals may be extensively applied to a case in which the eNB transmits an UP grant with respect to CC #2 to the UE through a specific physical control channel or physical data channel of CC #2.

In a case in which the UE receives the uplink grant at a specific time of TxOP_DL according to cross carrier scheduling, the TVI is a parameter indicating at which timing PUSCH must be transmitted at a subsequent TxOP set for UL data transmission (i.e. TxOP_UL). For example, in a case in which the UE receives the uplink grant at DL SF #n of TxOP_DL according to cross carrier scheduling and the TVI at DL SF #n is set to 1, the UE performs PUSCH transmission based on the uplink grant of DL SF #n at a first uplink subframe of a subsequent TxOP_DL.

Consequently, the VTI is different from an existing parameter meaning an absolute time difference between an uplink grant reception time and a PUSCH transmission time and may be very effectively applied in a case in which a carrier aggregation technique is applied using an unlicensed band in which guaranteeing a fixed PUSCH transmission time is difficult.

In addition, a reference point of the VTI may be implicitly assumed as a first uplink subframe of TxOP_UL or may be specifically designated through higher layer signaling or a physical channel.

1) The eNB may transmits information regarding the TVI per downlink subframe to the UE in a state of being included in a preamble transmitted to inform a start point of the TxOP or through a preamble previously designated for transmission of the VTI information (i.e. a semi-static technique). In this method, it is possible to newly designate information regarding the TVI per downlink subframe whenever the TxOP is set. The eNB may inform the UE of the information regarding the TVI per downlink subframe through a physical channel of CC #1 or CC #2 or higher layer signaling before data transmission through the TxOP is actually performed.

2) Alternatively, the eNB may transmits information regarding the TVI per downlink subframe to the UE through a physical channel of CC #1 or CC #2 or higher layer signaling or the information regarding the TVI per downlink subframe may be set according to a predetermined VTI allocation rule (i.e. a static technique). This method may be used to maintain the information regarding the TVI per downlink subframe at a fixed value for a relatively long period of time although TxOP setting is repeated.

In a case in which the maximum set length of TxOP_DL is defined as N_DL_MAX, the eNB may inform the UE of VTI information regarding N_DL_MAX DL SFs through higher layer signaling before a specific length of TxOP_DL is set such that the TVI information is maintained at a fixed value for a long period of time.

In addition, in the VTI allocation rule, it may be implicitly assumed that the TVI is allocated from a first DL SF of the set TxOP_DL in ascending order of power. This method does not require additional signaling.

In another example of the VTI allocation rule, only in a case in which an uplink grant is received using CCS at any DL SF, the VTI with respect to the DL SF may be implicitly assumed in ascending order of power.

3) In a further method, in a case in which the eNB transmits an uplink grant with respect to CC #2 to the UE at any downlink subframe through cross carrier scheduling, the eNB may inform the UE of a VTI regarding the corresponding downlink subframe through a physical channel of CC #1 or CC #2 or higher layer signaling (i.e. a dynamic technique).

In the semi-static technique, the static technique, and the dynamic technique as described above, when the eNB informs the UE of TVI information per downlink subframe through a physical channel of CC #1 or CC #2, a field for achieving this may be newly added to existing Downlink Control Information (DCI) for uplink grant transmission or a new DCI may be additionally defined. In addition, the eNB may inform the UE of TVI information per downlink subframe using a preamble previously defined for this purpose.

In addition, in the semi-static technique, the static technique, and the dynamic technique, VTIs of some downlink subframes may be set to a predetermined value (for example, 0 or a negative integer) to inform that an uplink grant has not been received at the corresponding downlink subframes through cross carrier scheduling or that, although an uplink grant has been received through cross carrier scheduling, PUSCH transmission interlocked with the uplink grant is not performed.

Alternatively, the VTI may be prescribed as a parameter indicating that the UE must refer to an uplink grant received at which timing of the previously set TxOP_DL section in order to transmit the PUSCH at a specific time of TxOP_UL. For example, in a case in which the UE performs PUSCH transmission at a first UL SF of TxOP_UL having a VTI set to 1, the UE refers to an uplink grant lastly received in the previously set TxOP_DL section.

Figure 26:
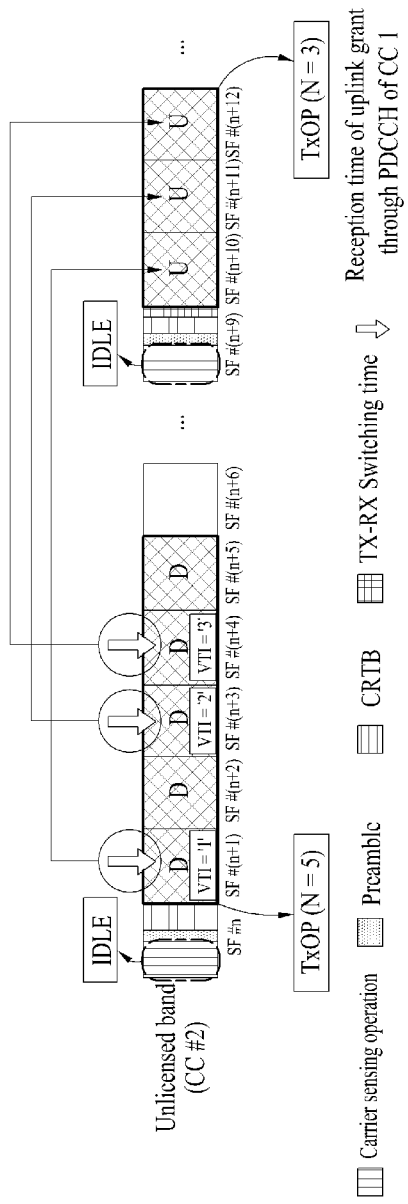
FIG. 26 is a view showing an example of performing PUSCH transmission according to a sixth embodiment of the present invention.

FIG. 26 is a view showing an example of performing PUSCH transmission according to a sixth embodiment of the present invention. In particular, in FIG. 26, it is assumed that an eNB transmits an uplink grant with respect to CC #2 to a UE at SF #(n+1), SF #(n+3), and SF #(n+4) of CC #1 according to cross carrier scheduling in the same manner as in FIG.

25. In addition, in FIG. 25, it is assumed that the eNB transmits information regarding a TVI per downlink subframe to the UE in a state of being included in a preamble transmitted to inform a start point of a TxOP Referring to FIG. 26, in a case in which VTIs at SF #(n+1), SF #(n+3), and SF #(n+4) at which the uplink grant has been received through cross carrier scheduling are set to 1, 2, and 3, respectively, PUSCH transmissions based on the uplink grant received at SF #(n+1), SF #(n+3), and SF #(n+4) of TxOP_DL through cross carrier scheduling are performed at a first uplink subframe, i.e. SF #(n+10), a second uplink subframe, i.e. SF #(n+11), and a third uplink subframe, i.e. SF #(n+12), of TxOP_UL, respectively.

<Seventh Embodiment>

Generally, ACK/NACK of an uplink grant is not additionally transmitted but is replaced by PUSCH transmission. In a case in which an eNB transmits an uplink grant with respect to CC #2 in an unlicensed band to a UE through a PDCCH of a CC #1 in a licensed band, however, the present invention proposes a method of the UE informing the eNB of ACK/NACK of reception of the corresponding uplink grant using a PUCCH resource linked to a CCE index of the uplink grant. ACK/NACK of reception of the uplink grant is a kind of confirmation message regarding reception of the uplink grant transmitted from the UE to the eNB.

In addition, in order to efficiently designate a dynamic resource region for transmission of ACK/NACK of reception of the uplink grant, the eNB may inform the UE of additional N_pucch_offset through higher layer signaling or a physical channel of CC #1 or CC #2. That is, ACK/NACK of reception of the uplink grant may be transmitted in a state of being efficiently multiplexed to an RB corresponding to the N_pucch_offset According to the seventh embodiment of the present invention, in a case in which a carrier aggregation technique is applied to an unlicensed band in which it is difficult to guarantee a fixed PUSCH transmission time, it is possible to effectively solve a problem which may be caused when the UE does not receive an uplink grant. That is, according to the conventional art, in a case in which the eNB transmits a UL grant with respect to CC #2 in an unlicensed band to the UE using CCS through a DL control channel, i.e. PDCCH, of CC #1 in a licensed band, it is difficult to guarantee PUSCH transmission to the UE through CC #2 at a predetermined time (i.e. a PUSCH transmission time interlocked with a UL grant transmission time) with the result that it is not possible for the eNB to rapidly confirm whether the UE has received the UL grant. However, the present invention may solve this problem.

The embodiments of the present invention may also be applied to a case in which a specific CC is commonly used among a plurality of cells and the use of the corresponding CC is independently set per cell. In addition, the embodiments of the present invention may also be applied to a case in which a primary component carrier (PCC) changes the use of a previously allocated specific radio resource of a secondary component carrier (SCC) using cross carrier scheduling (CCS). The disclosure of the present invention may be applied to a case in which the use of a (predefined) specific resource of each component carrier used in communication between a reception end and a transmission end under a CA environment is (dynamically) changed based on a load state of the system. The disclosure of the present invention may also be applied to a case in which a specific cell dynamically changes the use of an existing specific radio resource according to a load state of the system.

The disclosure of the present invention may be extensively applied to all conditions in which communication based on a PDCCH or an E-PDCCH is performed. In addition, in a case in which an extension carrier is additionally used in communication, the disclosure of the present invention may be extensively applied to set the use of a radio resource on the corresponding extension carrier or to perform interference mitigation cooperation between cells sharing the extension carrier.

The proposed methods may be extensively applied to a case in which, under a device-to-device (D2D) communication environment, the D2D communication is performed at a specific band allocated for such communication or to a case in which the previously set use of a specific radio resource (of a cell) is changed for (re)use in the D2D communication.

Figure 27:
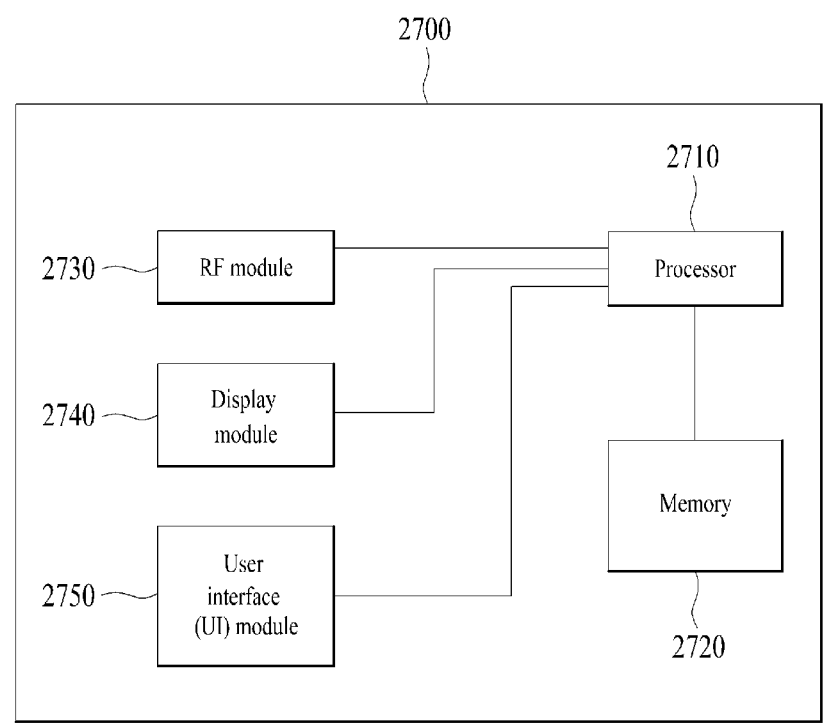
FIG. 27 is a block diagram showing a communication apparatus according to an embodiment of the present invention.

FIG. 27 is a block diagram showing a communication apparatus according to an embodiment of the present invention.

Referring to FIG. 27, a communication apparatus 2700 includes a processor 2710, a memory 2720, a Radio Frequency (RF) module 2730, a display module 2740, and a user interface module 2750.

The communication apparatus 2700 is shown for the convenience of description and some modules thereof may be omitted. In addition, the communication apparatus 2700 may further include necessary modules. In addition, some modules of the communication apparatus 2700 may be subdivided. The processor 2710 is configured to perform operations according to the embodiments of the present invention described with reference to the drawings. For a detailed description of the processor 2710, reference may be made to the description associated with FIGS. 1 to 26.

The memory 2720 is connected to the processor 2710 to store an operating system, applications, program code, data, etc. The RF module 2730 is connected to the processor 2710 to perform a function for converting a baseband signal into a radio signal or converting a radio signal into a baseband signal. To this end, the RF module 2730 performs analog conversion, amplification, filtering, and frequency up-conversion or inverse processes thereof. The display module 2740 is connected to the processor 2710 to display a variety of information. As the display module 2740, although not limited thereto, a well-known device such as a Liquid Crystal Display (LCD), a Light Emitting Diode (LED), or an Organic Light Emitting Diode (OLED) may be used. The user interface module 2750 is connected to the processor 2710 and may include a combination of well-known user interfaces such as a keypad and a touchscreen.

The embodiments of the present invention as described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by rational interpretation of the appended claims and all changes coming within the equivalency range of the appended claims are intended to be embraced therein.

Industrial Applicability

While a method of a user equipment transmitting and receiving a signal in a wireless communication system having a carrier aggregation technique applied thereto and an apparatus for the same according to the present invention as described above is applied to a 3GPP LTE system, the method and the apparatus according to the present invention can also be applied to a variety of other wireless communication systems.

The invention claimed is:

1. A method of a user equipment transceiving a signal to and from an eNode B in a wireless communication system having a carrier aggregation technique applied thereto, the method comprising:
    performing a carrier sensing procedure with respect to an unlicensed frequency band;
    configured the unlicensed frequency band as a specific component carrier upon sensing that the unlicensed frequency band is in an idle state;
    receiving a preamble in a subframe from the eNode B through the specific component carrier;
    determining the subframe as an uplink subframe or a downlink subframe based on the preamble, wherein the preamble includes information indicating the uplink subframe or the downlink subframe; and
    performing transmission of an uplink signal in the determined uplink subframe to the eNode B through the specific component carrier, or reception of a downlink signal in the determined downlink subframe from the eNode B through the specific component carrier according to a result of determining.

2. The method according to claim 1, wherein the subframe comprises a guard section between a reception section of the preamble and a transmission section of the uplink signal or a reception section of the downlink signal.

3. The method according to claim 1, wherein, in a case in which the subframe is determined as the uplink subframe, the subframe comprises a reception section of the preamble, a first guard section, a transmission section of the uplink signal, and a second guard section.

4. The method according to claim 3,
    wherein the first guard section is a reception-transmission switching time of the user equipment, and
    wherein the second guard section is a transmission-reception switching time of the user equipment.

5. A user equipment, comprising:
    a radio frequency (RF) module configured to transceiver a signal to and from an eNode B in a wireless communication system having a carrier aggregation technique applied thereto; and
    a processor coupled to the RF module and configured to:
    perform carrier sensing procedure with respect to an unlicensed frequency band;
    configure the unlicensed frequency band as a specific component carrier upon sensing that the unlicensed frequency band is in an idle state;
    control the RF module to receive a preamble in a subframe from the eNode B through the specific component carrier;
    determining the subframe as an uplink subframe or a downlink subframe based on the preamble, wherein the preamble includes information indicating the uplink subframe or the downlink subframe; and
    control the RF module to perform transmission of an uplink signal in the determined uplink subframe to the eNode B through the specific component carrier, or reception of a downlink signal from in the determined downlink subframe the eNode B through the specific component carrier according to a result of the determination.

6. The user equipment according to claim 5, wherein the subframe comprises a guard section between a reception section of the preamble and a transmission section of the uplink signal or a reception section of the downlink signal.

7. The user equipment according to claim 5, wherein, in a case in which the subframe is determined as the uplink subframe, the subframe comprises a reception section of the preamble, a first guard section, a transmission section of the uplink signal, and a second guard section.

8. The user equipment according to claim 7,
    wherein the first guard section is a reception-transmission switching time of the user equipment, and
    wherein the second guard section is a transmission-reception switching time of the user equipment.

* * * * *